United States Patent [19]
Latif et al.

[11] Patent Number: 5,289,580
[45] Date of Patent: Feb. 22, 1994

[54] PROGRAMMABLE MULTIPLE I/O INTERFACE CONTROLLER

[75] Inventors: Farrukh A. Latif, Malvern; Michael D. Stevens, Paoli; John A. Moysey, Malvern; Michael Shinkarovsky, Harleysville; Hung Nguyen, Downingtown; Michele Z. Dale, Audubon, all of Pa.

[73] Assignee: Unisys Corporation, Plymouth Meeting, Pa.

[21] Appl. No.: 698,585

[22] Filed: May 10, 1991

[51] Int. Cl.$^5$ .............................................. G06F 13/00
[52] U.S. Cl. ................................................... 395/275
[58] Field of Search ................. 364/DIG. 1, DIG. 2, 364/275, 325, 500

[56] References Cited

U.S. PATENT DOCUMENTS

| | | |
|---|---|---|
| 4,641,263 | 2/1987 | Perlman et al. |
| 4,707,803 | 11/1987 | Anthony, Jr. et al. |
| 4,782,461 | 11/1988 | Mick et al. |
| 4,787,028 | 11/1988 | Finfrock et al. ........... 364/200 |
| 4,802,116 | 1/1989 | Ward et al. |
| 4,855,905 | 8/1989 | Estrada et al. ........... 364/200 |
| 4,964,074 | 10/1990 | Suzuki et al. |

Primary Examiner—Robert L. Richardson
Attorney, Agent, or Firm—Ratner & Prestia

[57] ABSTRACT

An I/O interface controller is disclosed which can be programmed to interact with a variety of interface protocols. The host side and the peripheral side of the interface controller are independently programmable. All significant operations are performed in a single chip gate array. The gate array includes registers for establishing control with peripheral devices and for transferring data between peripheral devices and the host. An arithmetic logic unit is used for calculation and data manipulation while an I/O operation is occurring. A condition code multiplexer evaluates the contents of registers within the single chip and instructs the sequencer to perform various operations based on these results. Strobe signals from a peripheral device, indicating that valid data is ready to be transferred, are quickly acknowledged by virtue of an asynchronous signal path. The strobe signal is also processed so that it may correspond with the internal clock of the I/O interface. An asynchronous event driver and recognizer mechanism is also disclosed. This mechanism enable the I/O interface controller to drive the host side and the peripheral side interfaces simultaneously.

33 Claims, 28 Drawing Sheets

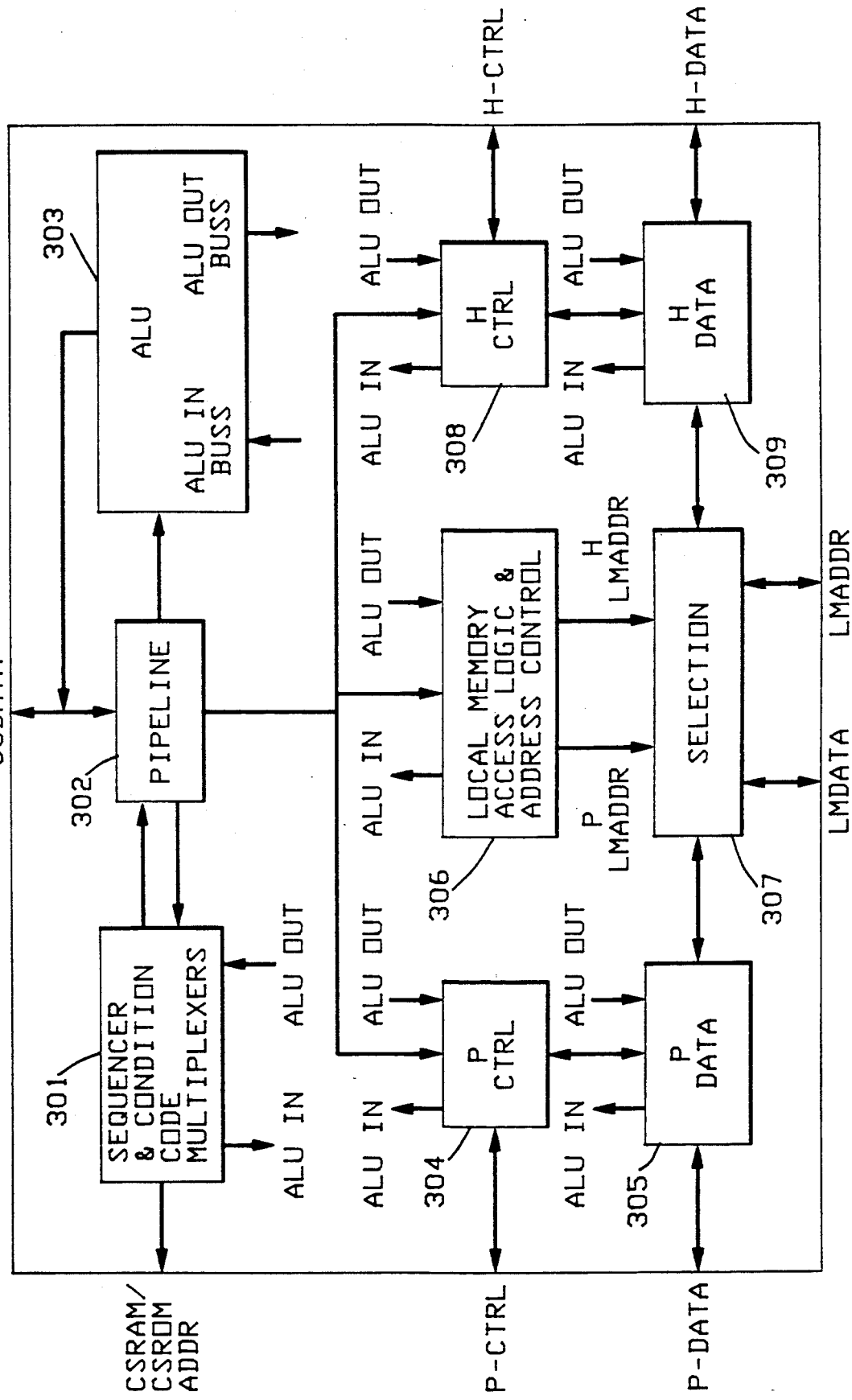

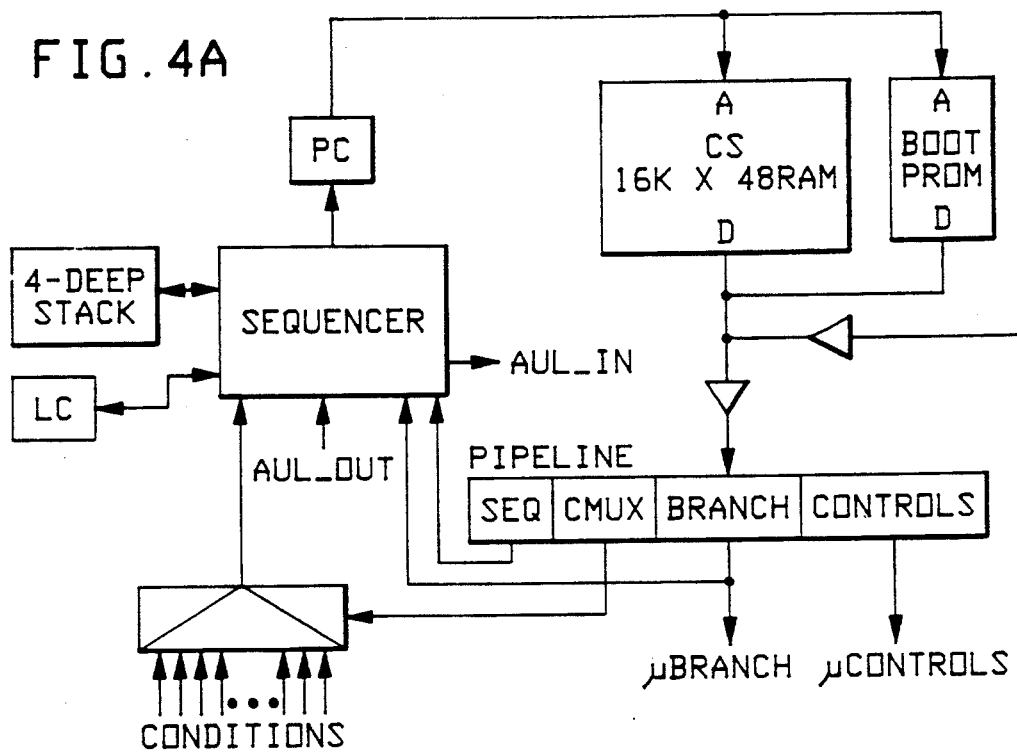
FIG. 4A
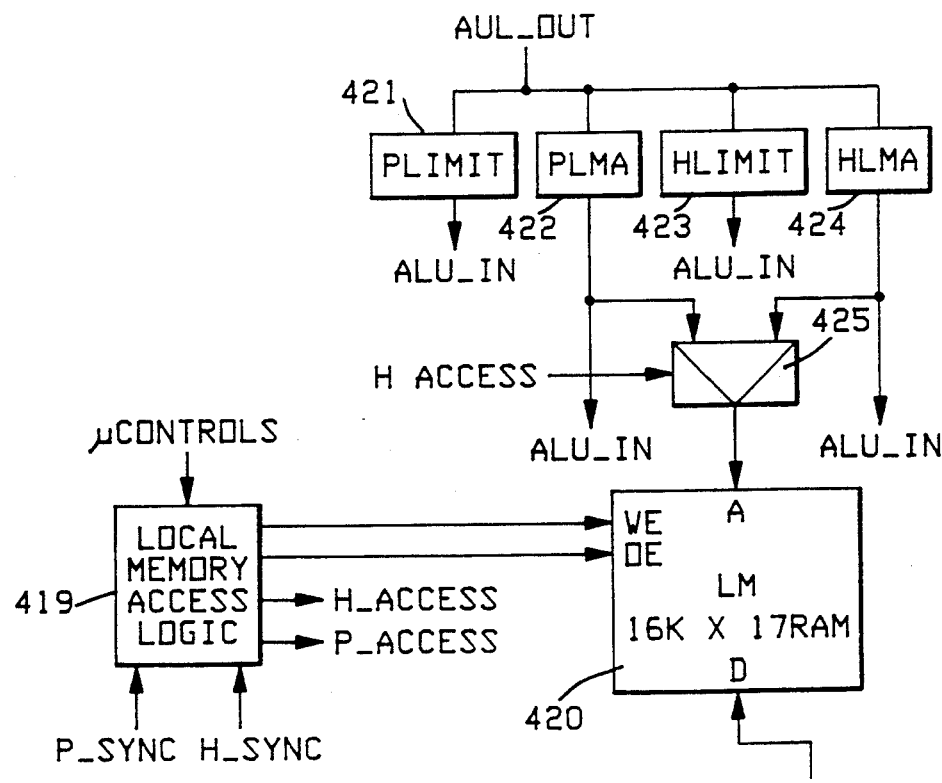

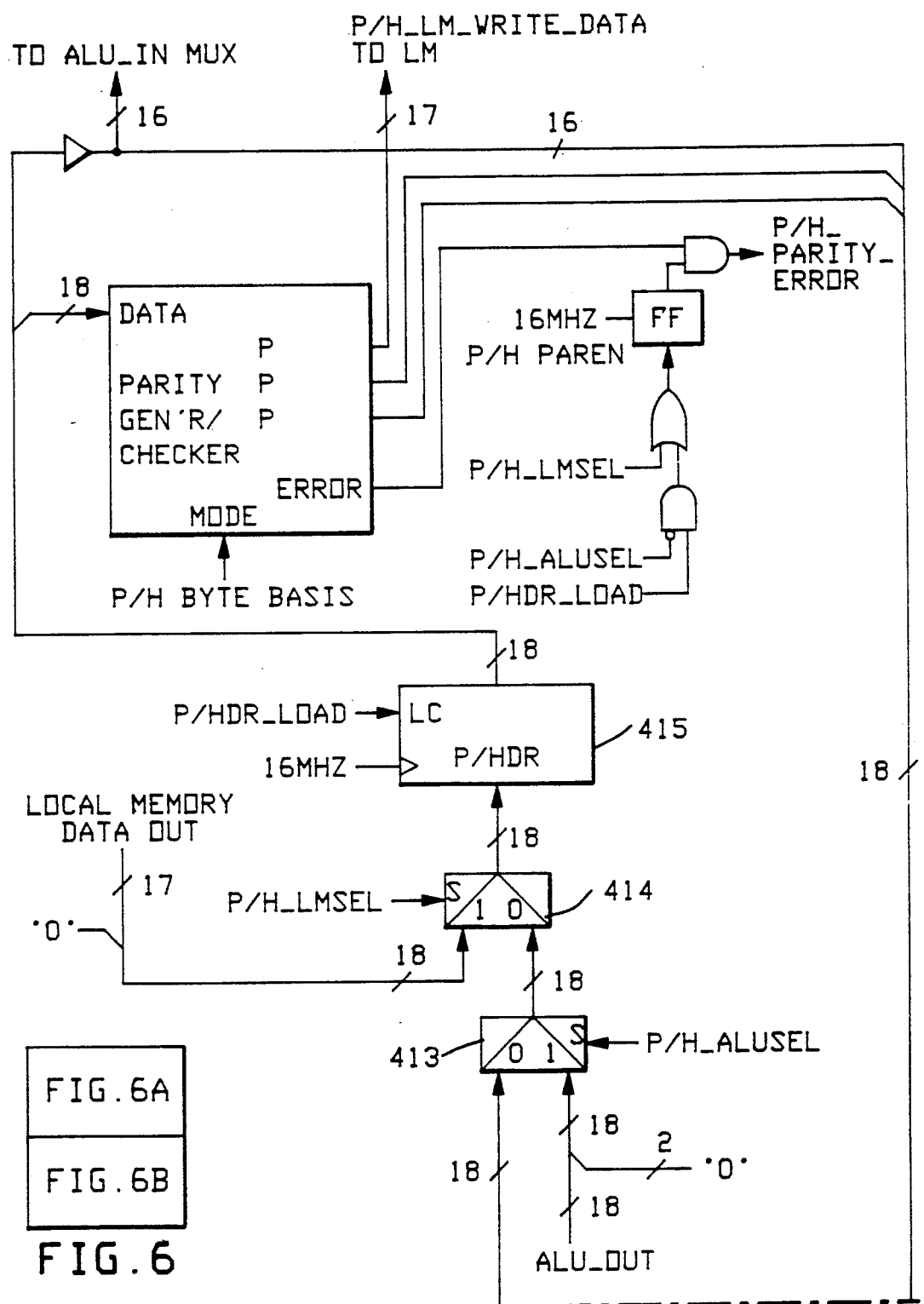

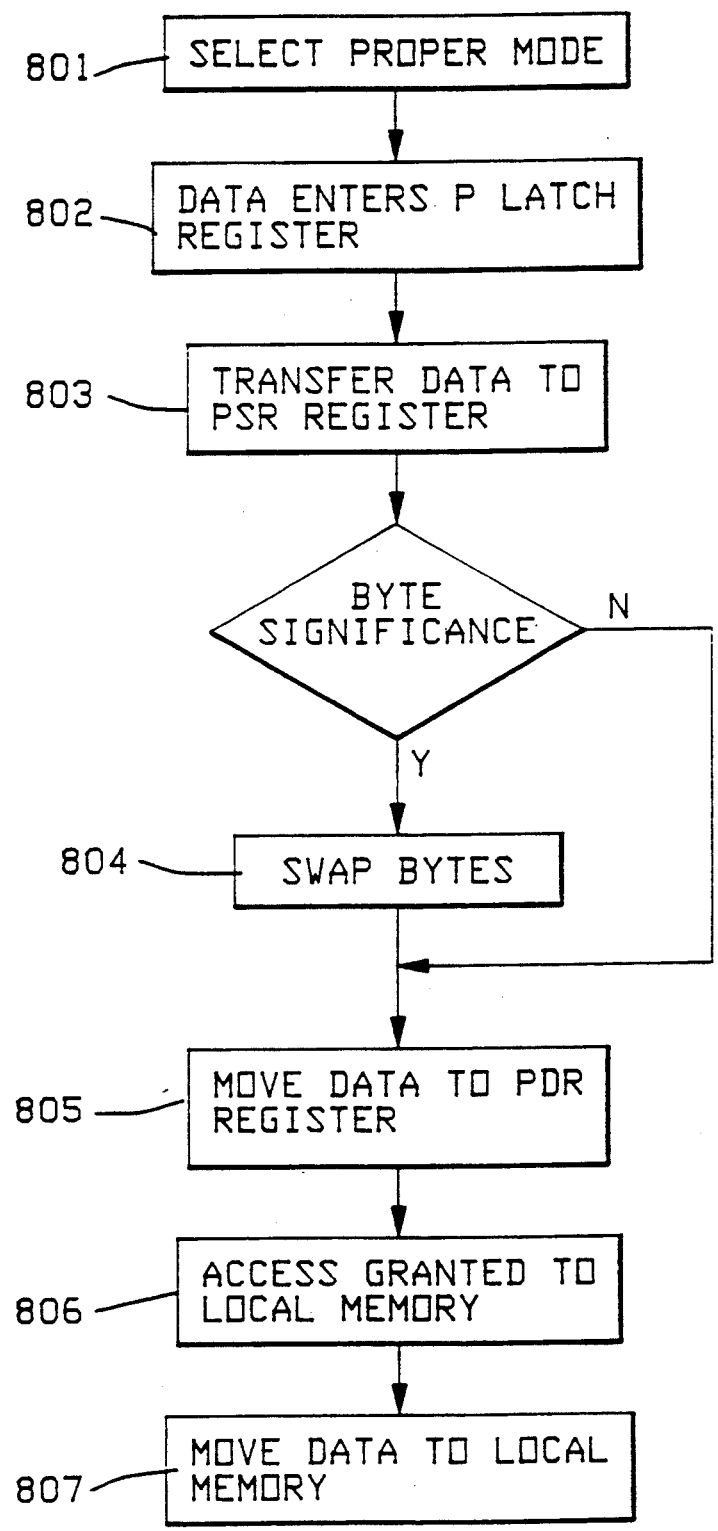

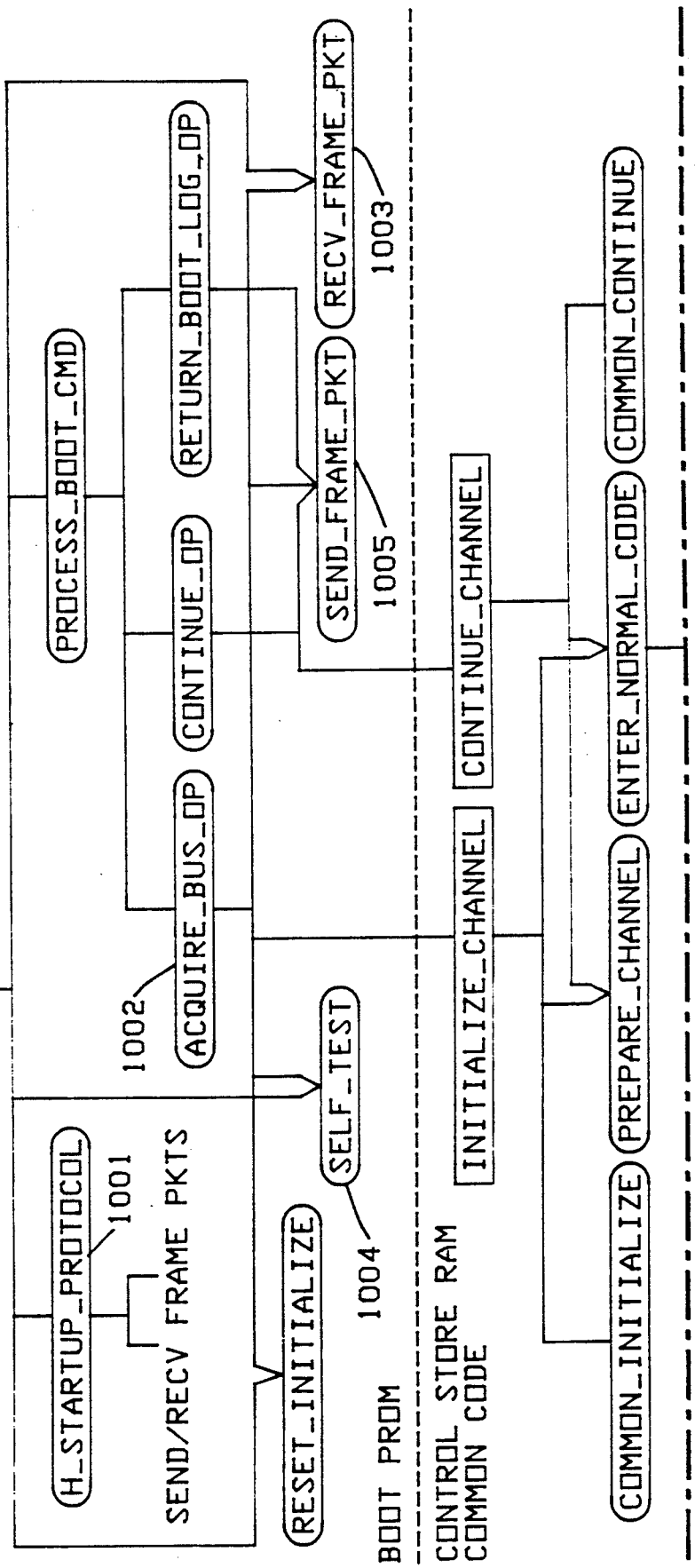

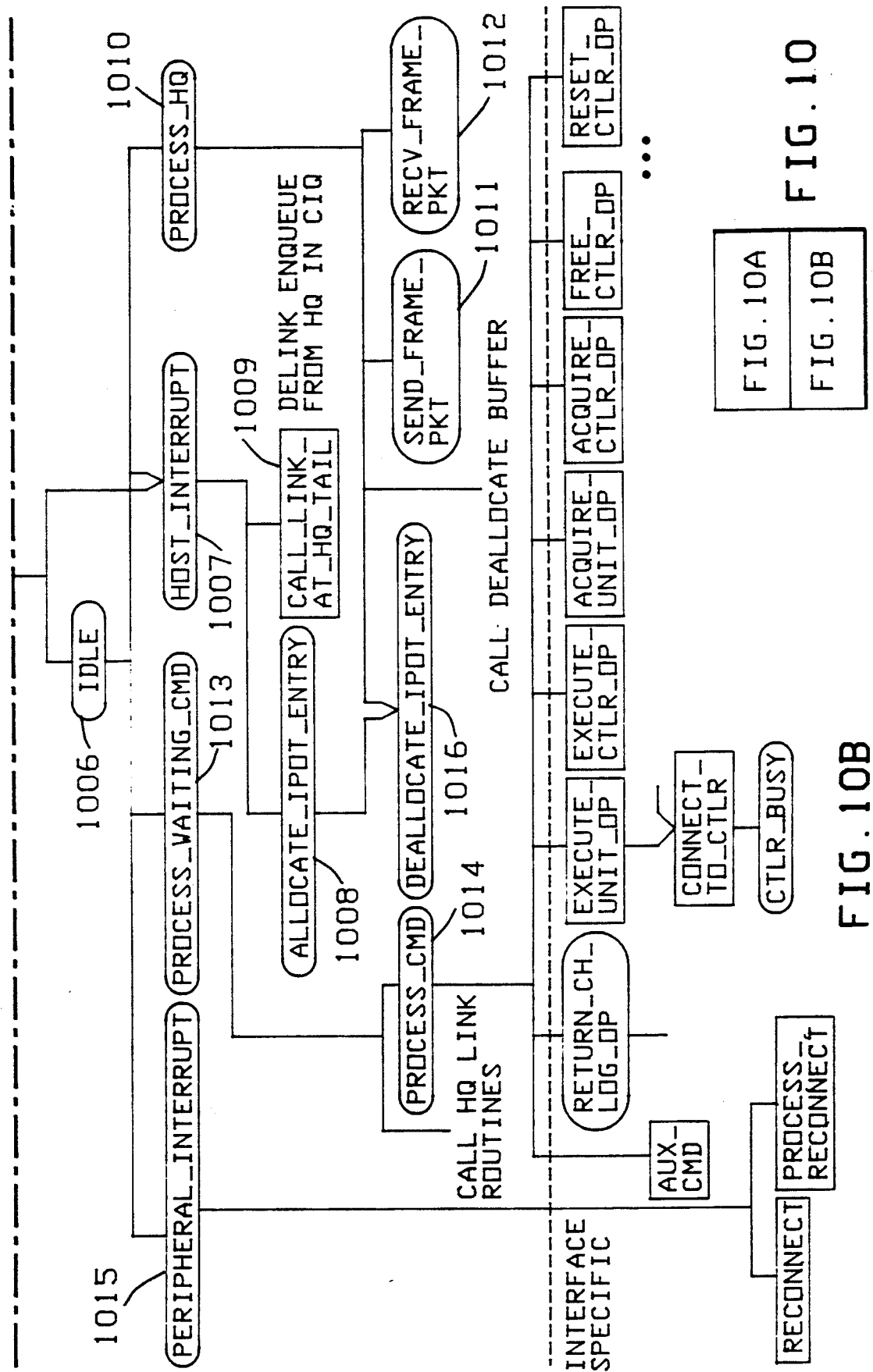

| FIG. 11A |
| FIG. 11B |

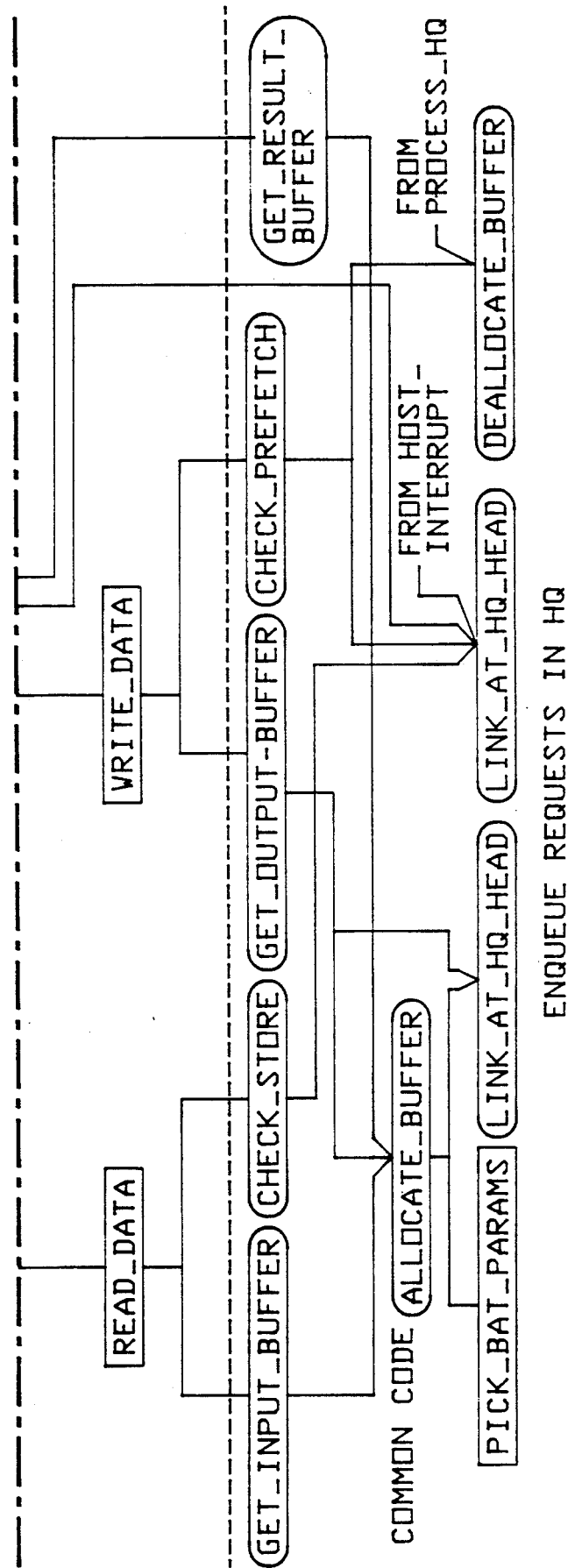
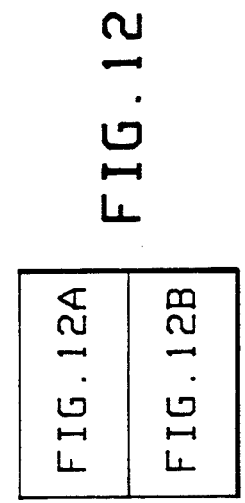
FIG. 12B
FIG. 12
| FIG. 12A |
| FIG. 12B |

ISW

| 15 12 | 11 8 | 7 4 | 3 0 |
|---|---|---|---|
| H CONTROL FIELD || P CONTROL FIELD ||
| H PARALLEL | H DECODED | P PARALLEL | P DECODED |

TCW

| 15 8 | 7 0 |
|---|---|
| H INTERFACE MAX TIME FIELD | P INTERFACE MAX TIME FIELD |

TRW

| 15 0 |
|---|
| REFERENCE TO H TASK WAITING ON EVENT (IPOT ADDRESS) |

| 15 0 |
|---|
| REFERENCE TO P TASK WAITING ON EVENT (IPOT ADDRESS) |

FIG. 16

PROGRAMMABLE MULTIPLE I/O INTERFACE CONTROLLER

FIELD OF THE INVENTION

This invention is in the field of computing systems and specifically relates to I/O interface controllers. In particular, an I/O interface controller is disclosed which has separately programmable host and peripheral connections to emulate a variety of interfaces. The interfaces connect to a host computer and a peripheral device, respectively.

BACKGROUND OF THE INVENTION

Conventional computer architectures include one or more computer processors which are connected to memory devices, and one or more peripheral devices for performing I/O operations. A typical computer architecture is shown with reference to FIG. 1. Data is transferred between computer processor 101 and I/O device 105. I/O device 105 can be any of a plurality of peripheral devices including disc drives, tape drives, printers, etc. I/O interface controller 103, shown interposed between computer processor 101 and I/O device 105 is responsible for controlling the transfer of information between computer processor 101 and I/O device 105.

Communications between computer processor 101 and I/O device 105 are conducted according to a predetermined format of signal transmission. This format allows the computer processor to selectively address and activate any of the devices coupled to the channel. The devices respond to predetermined address information, and interchange signals with the processor according to a predetermined format selected for the particular system.

A variety of predetermined formats (i.e. protocols) currently exist for enabling communication between computer processor 101 and I/O device 105. The I/O interface controller 103 addresses the concept of these varying formats of communication. These protocols include Message Level Interface (MLI), Small Computer System Interface (SCSI) and Intelligent Peripheral Interface (IPI).

These protocols differ, not only physically and electrically, but also in the quantity of data which may be handled and the manner in which handshaking is performed.

Several protocols transfer two bytes of data at one time, while other protocols may only transfer a single byte at a time. The MLI protocol transfers two bytes at once. The SCSI protocol transfers only a single byte at a time. The IPI protocol may transfer either a single or a double byte at once, depending upon the manner in which the I/O channel is programmed. Furthermore, when some channels receive two bytes of data, the position of the two bytes must be exchanged.

These protocols also differ in the manner in which control signals are exchanged between the computer processor and the I/O device to ensure that data is properly transferred between the two. Typically, when data is transmitted to the I/O interface controller, a strobe signal is simultaneously asserted. This strobe signal indicates to the I/0 interface controller that the data is valid and may be received. Strobe signals are handled in varying manners depending on the protocol being used. For example, a protocol may include an interlock mode in which a single strobe is fired to indicate that data is available for processing at this time. The processor then waits for a response before transmitting the next data word. If a protocol includes a throttle mode, multiple strobes are issued by the processor at a controlled rate. Thus, the transmission of every data word is accompanied by a strobe. The processor does not wait for an acknowledgement of a particular strobe before making the next data word available. If a protocol includes a mirror mode, the I/O device issues a plurality of strobes which are simply reflected back to the I/O device by the I/O interface controller. If a mirror mode is being used, however, the strobe rate is controlled by the I/O device.

Prior art I/O interface controllers have used various techniques to acknowledge receipt of a strobe. These techniques allow the incoming strobe to be acknowledged after first synchronizing the strobes to the internal clock signal of the I/O interface controller. This provides the necessary reliability factor which is desirable to prevent ill effects (such as data corruption). A high speed is generally achieved by using multi-phased clocks. If the chosen technology for implementation is such that it can tolerate very high frequency clock signals (e.g., 32 Mhz) (compared to the rate at which the interface between the I/O interface controller and either the host processor or the peripheral device operates), then the interfaces may be operated at near capacity throughput without undue complexity.

However, the slower technologies, for example CMOS (often chosen in data processing applications) cannot tolerate very high frequency clock signals. Their clock rate is very comparable to the rate at which the interface between the I/O interface controller and either the host processor or the peripheral device can operate. Thus, if the incoming strobe is synchronized before being acknowledged, then the synchronizing delay adds to the turnaround time of each strobe. This considerably reduces the overall performance of the I/O interface controller.

A variety of off-the-shelf chips are currently available for use as I/O interface controllers. These chips suffer from a variety of drawbacks. Each chip is designed to enable communications through only a single predetermined protocol. Furthermore, these chips require microprocessor type controllers to drive them. This requires additional hardware and logic. In addition, these chips cannot be used when the computer processor communicates using one protocol and the I/O device communicates using another incompatible protocol. Also, prior art I/O interface controllers, because they are monitoring the activity on two dissimilar interfaces (with the host processor and with the I/O device) typically require separate processors for monitoring each interface.

SUMMARY OF THE INVENTION

The present invention is in the context of an I/O interface controller which can be programmed to interact with a variety of interface protocols. The I/O interface controller substantially consists of two components: a host side which interacts with the host processor and a peripheral side which interacts with the peripheral device. The host side and the peripheral side of the interface controller are independently programmable. Separate mechanisms exist for establishing control with a host processor and with a peripheral device. Data may be transferred between the interfaces of the host processor and the peripheral device through the manipulation of control structures in various queues located in a buffer memory interposed between the host side and the peripheral side. Data may be transferred automatically and independently through the host port and the peripheral port to the buffer memory after the ports have been independently initialized by a microprocessor. This microprocessor is capable of monitoring the interfaces between the I/O interface controller and the host processor and peripheral device simultaneously so it may respond to events occurring on each interface.

According to another aspect of the invention, a strobe signal transmitted by either the host processor or the peripheral device may be quickly acknowledged by virtue of an asynchronous signal path and may be simultaneously processed so that it may correspond with the internal clock of the I/O interface controller.

DESCRIPTION OF THE FIGURES

FIG. 3 is a block diagram which shows the architecture of the IACT chip shown in FIG. 2.

FIGS. 4A through D is a logic diagram which shows the internal architecture of the IACT chip in greater detail. A local memory and a control store boot PROM are also shown.

FIG. 6 which includes FIGS. 6A through B is a logic diagram which shows the architecture of the channel data path, shown in FIG. 4, in greater detail.

FIG. 7 which includes

FIG. 8 is a flow chart diagram which shows data transfer from the I/O interface shown in FIG. 4 to the local memory of the I/O interface controller shown in FIG. 4.

FIG. 10 which includes FIGS. 10A through B is a flow chart diagram which shows the sequence of operation of the common channel microcode which controls the sequencer shown in FIG. 3.

FIG. 12 which includes FIGS. 12A through B is a flow chart diagram which shows the sequence of operations of the IPI channel microcode which controls the sequencer shown in FIG. 3.

FIG. 16 is a data structure diagram which shows the internal structure of the Interrupt State Word (ISW), the Time Count Word (TCW) and the Task Reference Word (TRW) which are used by the sequencer shown in FIG. 3.

OVERVIEW

The present invention is a programmable I/O interface controller which can emulate several standard and proprietary interfaces. The controller has separately programmable host and peripheral connections. Thus, the controller can interface with a host processor using one protocol and with a peripheral device using another possibly incompatible protocol. The controller includes a strobe detection mechanism which can asynchronously acknowledge an incoming strobe while synchronizing this strobe to the I/O controller's internal clock. Furthermore, a single sequencer is able to recognize separate events occurring at the host connections and the peripheral connections.

Figure 2:
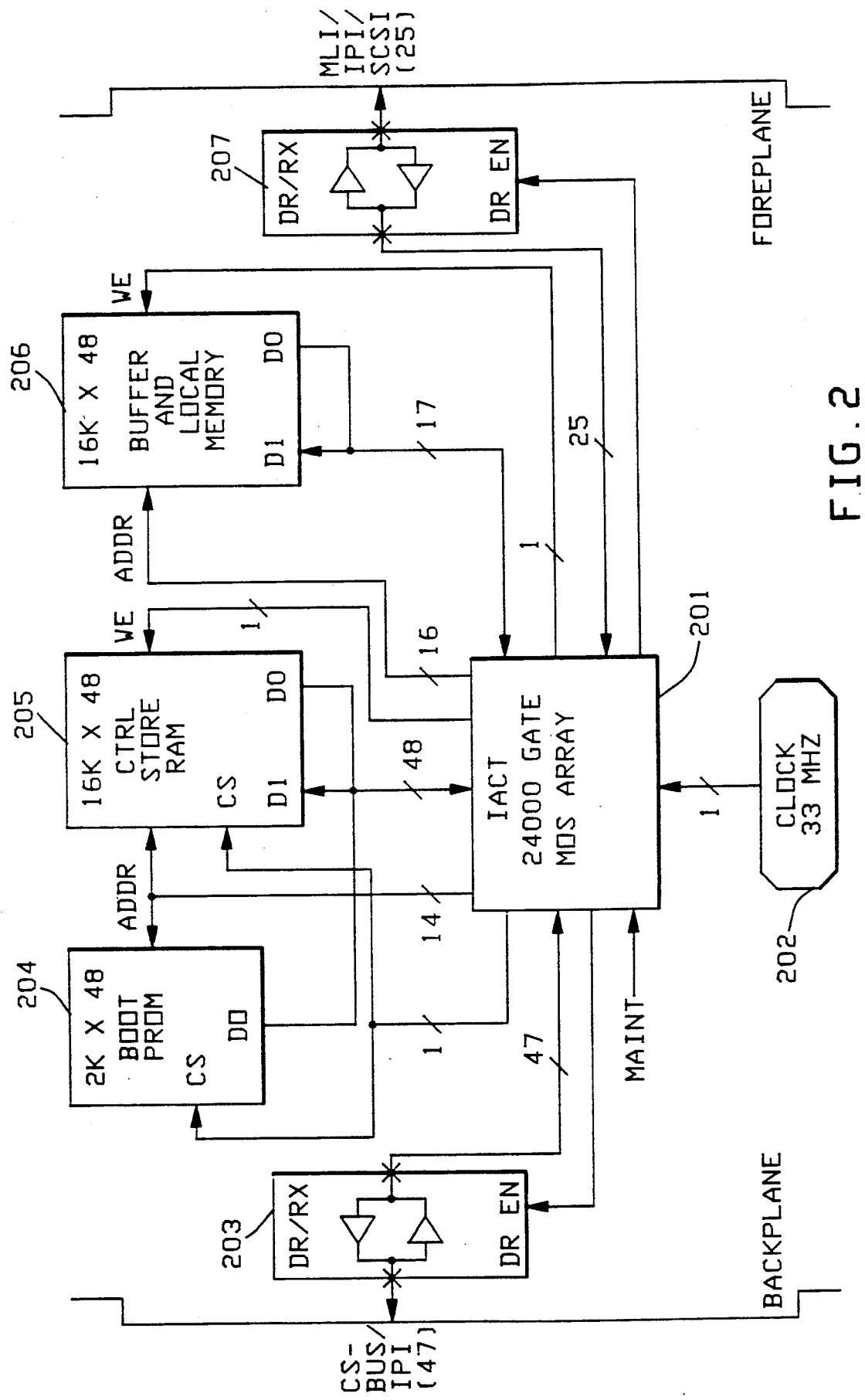
FIG. 2 is a block diagram which shows the architecture of the interface controller which includes an embodiment of the present invention.

FIG. 2 shows an exemplary embodiment of the present invention. A single chip controller (IACT) 201 transfers data between the host processor and the peripheral device through the drivers/receivers 203 and 207, respectively. The IACT is initialized with microcode contained in a boot prom 204 until the host processor downloads microcode into the control store RAM 205. The IACT may use memory 206 for local storage of control structures and data buffers.

FIG. 3 shows the internal architecture of the IACT 201. Peripheral control module (P CTLR) 304 and host control module (H CTRL) 308 transfer control signals between the peripheral device and the host processor, respectively. Peripheral data module (P DATA) 305 and host data module (H DATA) 309 transfer data signals between the peripheral device and the host processor, respectively. Sequencer and Condition Code Multiplexers 301 may selectively control the operation of P CTRL 304, P DATA 305, H CTRL 308 and H DATA 309. An arithmetic logic unit (ALU) 303 is included for performing arithmetic processing.

Figure 4B:
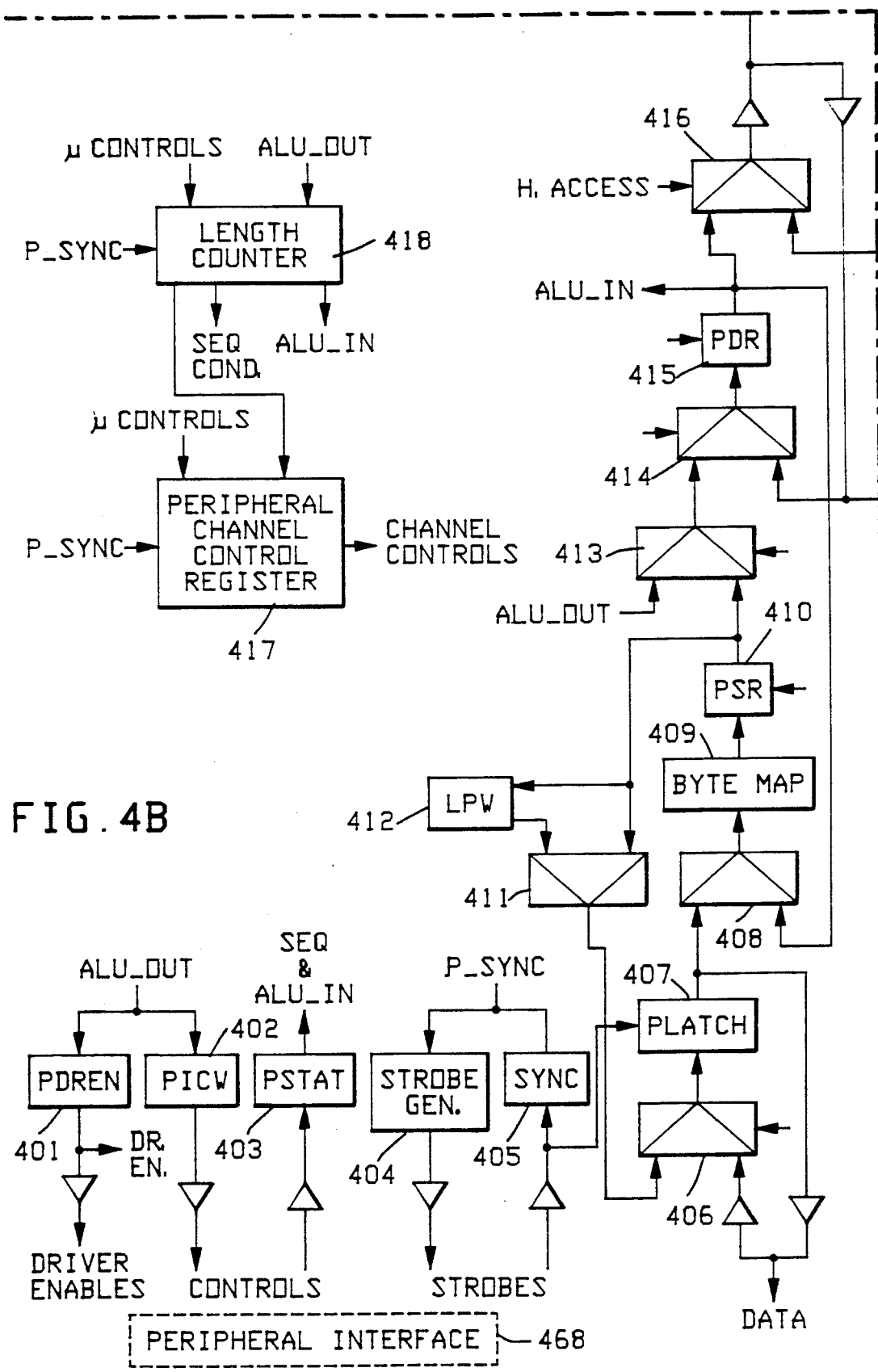
Figure 4C:
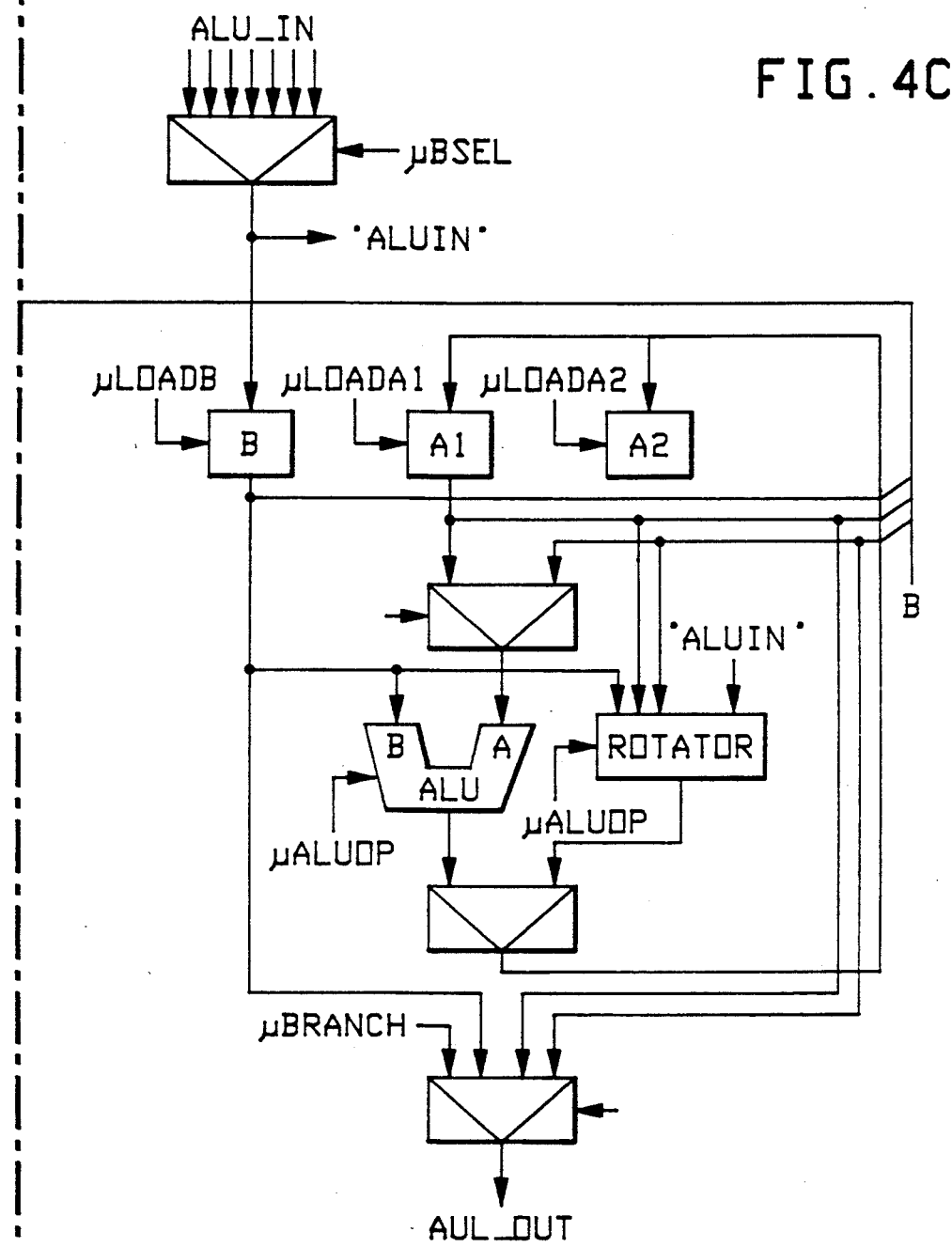
Figure 4:
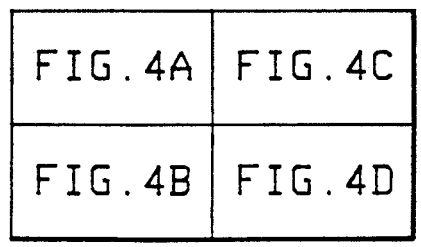
FIG. 4 which includes
Figure 4D:
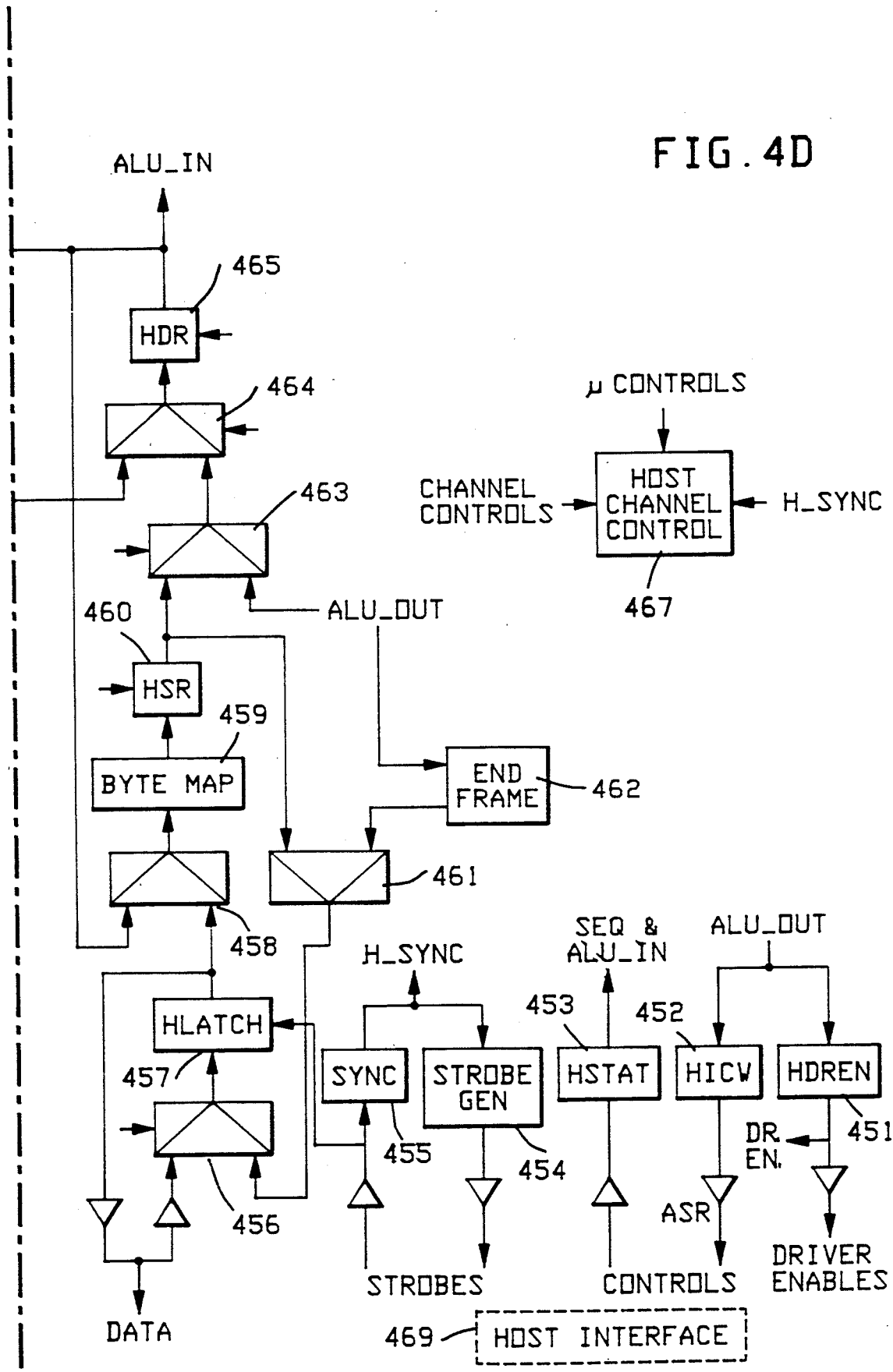

FIG. 4 shows the internal architecture of the IACT 201 in greater detail compared with FIG. 3. A plurality of registers including P LATCH 407, PSR 410 and PDR 415, as part of P DATA, are used for transferring data between local memory 420 and the peripheral device. Similarly, a plurality of register including H LATCH 457, HSR 460 and HDR 465, as part of H DATA, are used for transferring data between local memory 420 and the host processor. A plurality of registers including PDREN 401, PICW 402 and PSTAT 403, as part of PCTRL, are used for transferring control signals between the peripheral device and the I/O controller. A plurality of registers including HDREN 451, HICW 452 and HSTAT 453, as part of H CTRL, are used for transferring control signals between the host device and the I/O controller.

Figure 14:
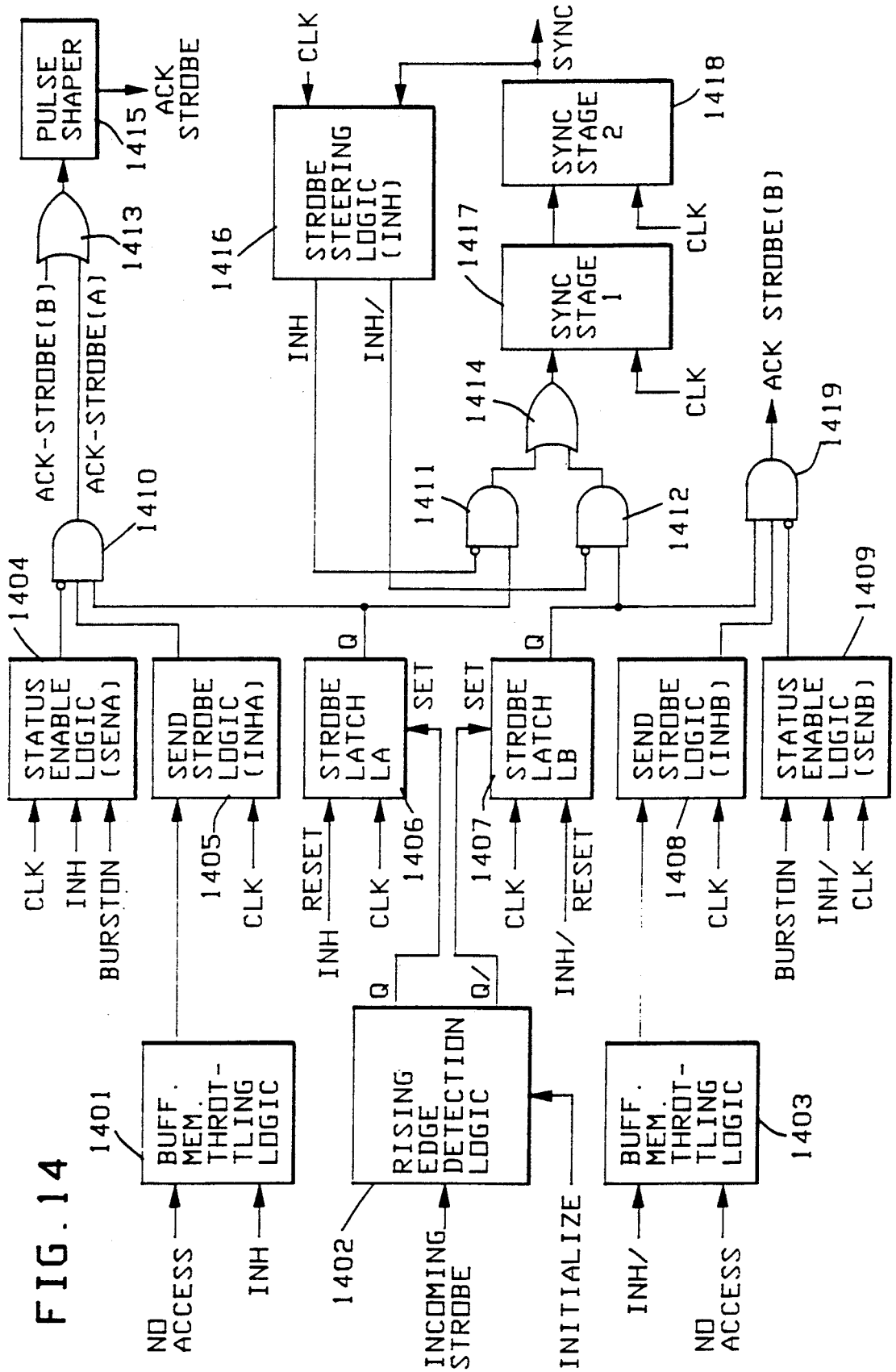
FIG. 14 is a logic schematic diagram which shows the structure of the strobe acknowledgement and synchronization circuits shown in FIG. 4.

FIG. 14 shows a strobe detection and recognition circuit, which, when used in conjunction with architecture of FIG. 4, allows incoming strobe signals to be asynchronously acknowledged with minimal propagation delay, while simultaneously synchronizing the incoming strobe signals with the I/O controller internal clock.

FIG. 16 shows a plurality of data structures which allow the IACT to recognize and process events occurring on both the interface between the I/O interface controller and the peripheral device and the interface between the I/O interface controller and the host processor. These data structures may be used in combination with the algorithm shown in the flowchart diagram of FIG. 17 to achieve the aforementioned event recognition and processing.

DETAILED DESCRIPTION

Figure 1:
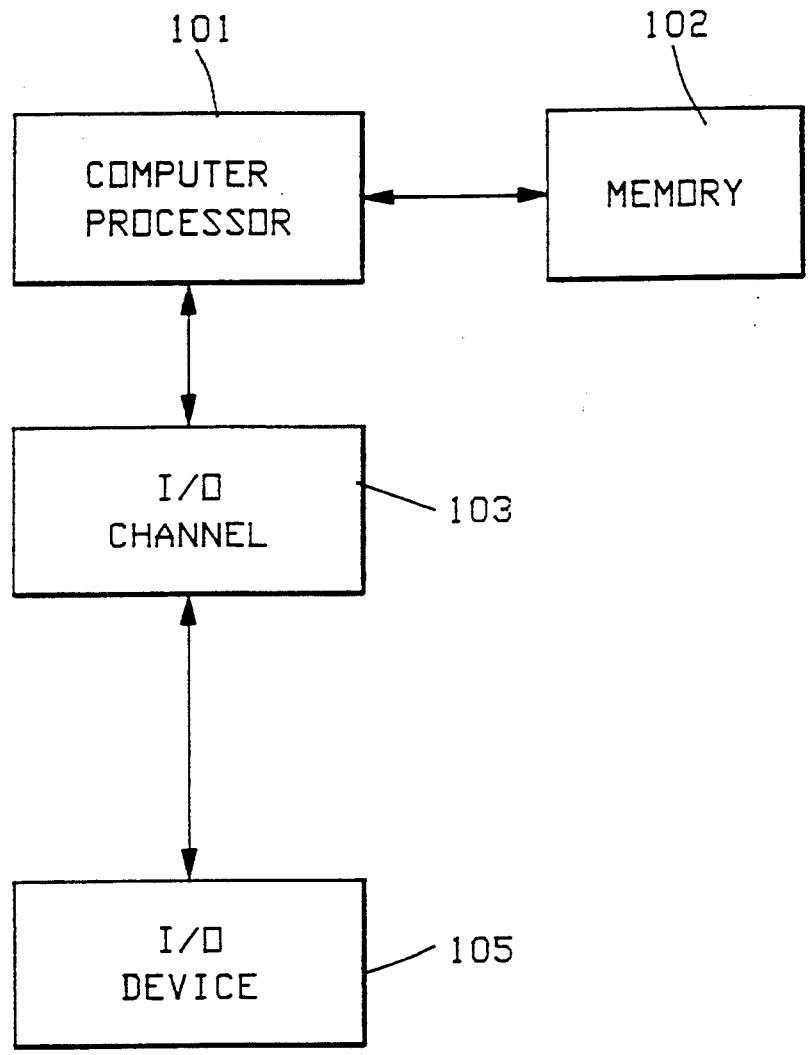
FIG. 1 is a block diagram which shows the I/O path in a typical computer system.

An exemplary embodiment of a programmable I/O interface controller is shown with reference to FIG. 2. A single integrated circuit controller (IACT) 201, is used for controlling the programmable I/O interface controller. The IACT 201 is driven by clock 202. Signals are transmitted between the host processor 101 and the I/O interface controller 103 (shown in FIG. 1) through a plurality of driver/receivers 203. Similarly, signals are exchanged between the I/O interface controller and the peripheral device 105 through a plurality of drivers/receivers 207. A boot PROM 204 is used for initializing the I/O interface controller. A control store RAM 205, receives microcode from the host after the boot PROM 204 has initialized the I/O interface controller. When the transmission of microcode to the control store RAM 205 is complete, operation of the I/O interface controller is governed by the microcode in the control store RAM 205. A buffer and local memory 206 is used for memory storage by the I/O interface controller.

A block diagram which illustrates the architecture of the IACT is shown with reference to FIG. 3. An arithmetic logic unit (ALU) 303 performs arithmetic operations within the IACT. The sequence and condition code multiplexer SCCM 301 receives microcode from the boot PROM 204 (initially) and from the control store RAM 205 (after the microcode has been loaded). In addition, the sequence and condition code multiplexer 301 receives status information from the ALU 303 and from status lines (not shown) which monitor signal levels in various parts of the IACT. Based upon the information which is received, the SCCM 301 instructs parts of the IACT to perform various functions. The peripheral control module (P CTRL) 304 includes a plurality of registers which are used for establishing control with the peripheral device. The host control module (H CTRL) 308 has an architecture which is substantially similar to that of P CTRL 304 and is used for establishing control with the host processor. The peripheral data module (P DATA) 305 is used for transferring data between the peripheral device and the I/O interface controller. The host data module (H DATA) 309 has an architecture which is substantially similar to that of P DATA 305 and is used for transferring data between the host processor and the I/O interface controller. Local memory access and address control are is also provided via the logic 306. The SCCM 301 controls the ALU 303, P CTRL 304, P DATA 305, H CTRL 308, H DATA 309 and the Local memory access and address control logic 306 through a microcode instruction fetched from the CSRAM and executed through the pipeline 302.

A logic diagram which shows the internal structure of the IACT is shown with reference to FIG. 4. Because of the substantial similarities between P DATA 305 and H DATA 309, and between P CTRL 304 and H CONTROL 308, only P DATA 305 and P CTRL 304 will be discussed, in detail.

The bit value held by the PICW register 402 defines the status of certain interface control signals. The value held by the PICW register 402 can be written by the sequence and condition code multiplexer 301. The output of the PICW register (each bit) passes through the drivers and pins of the IACT chip and is connected to the data input of a specific driver on the channel interface board. Thus, by setting appropriate bits in the PICW register, the sequence and condition code multiplexer 301 can assert specific logic signals on the output terminals of channel interface drivers.

Each bit of the PDREN register 401 controls board drivers by enabling or disabling particular drivers. The value held by the PDREN register 401 can also be written by the sequence and condition code multiplexer 301. Thus, to assert a particular signal on the channel interface, the SCCM first loads the PDREN register 401 to turn the appropriate driver on. Then, the SCCM 301 loads the PICW register 402 with particular values to cause the enabled drivers to assume appropriate logic states. The PDREN register 401 also provides tristate and bi-directional control of the interface control signals.

Figure 7A:
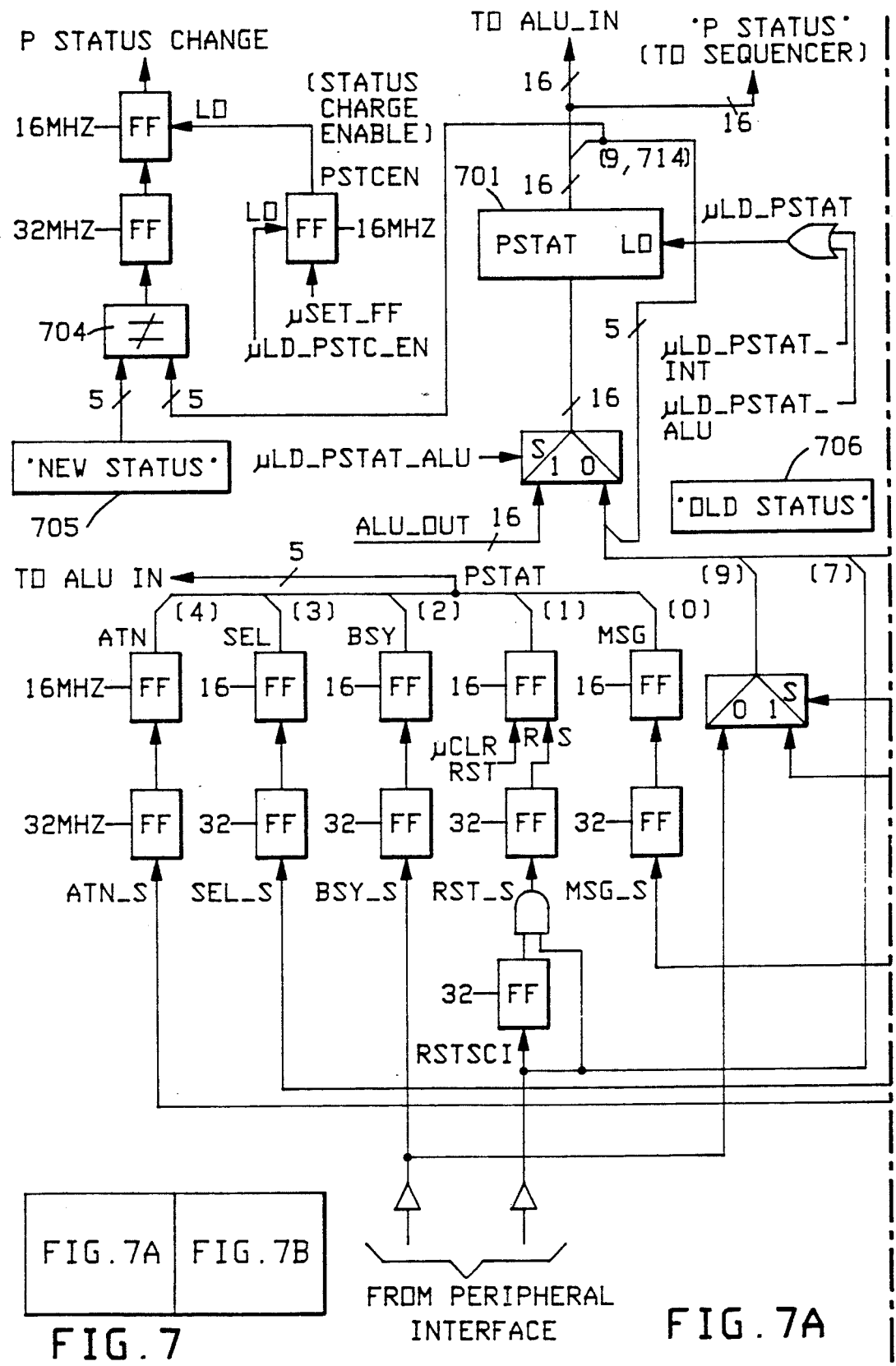
FIGS. 7A through B is a logic diagram which shows the architecture of the peripheral interface controls, shown in FIG. 4, in greater detail.
Figure 7B:
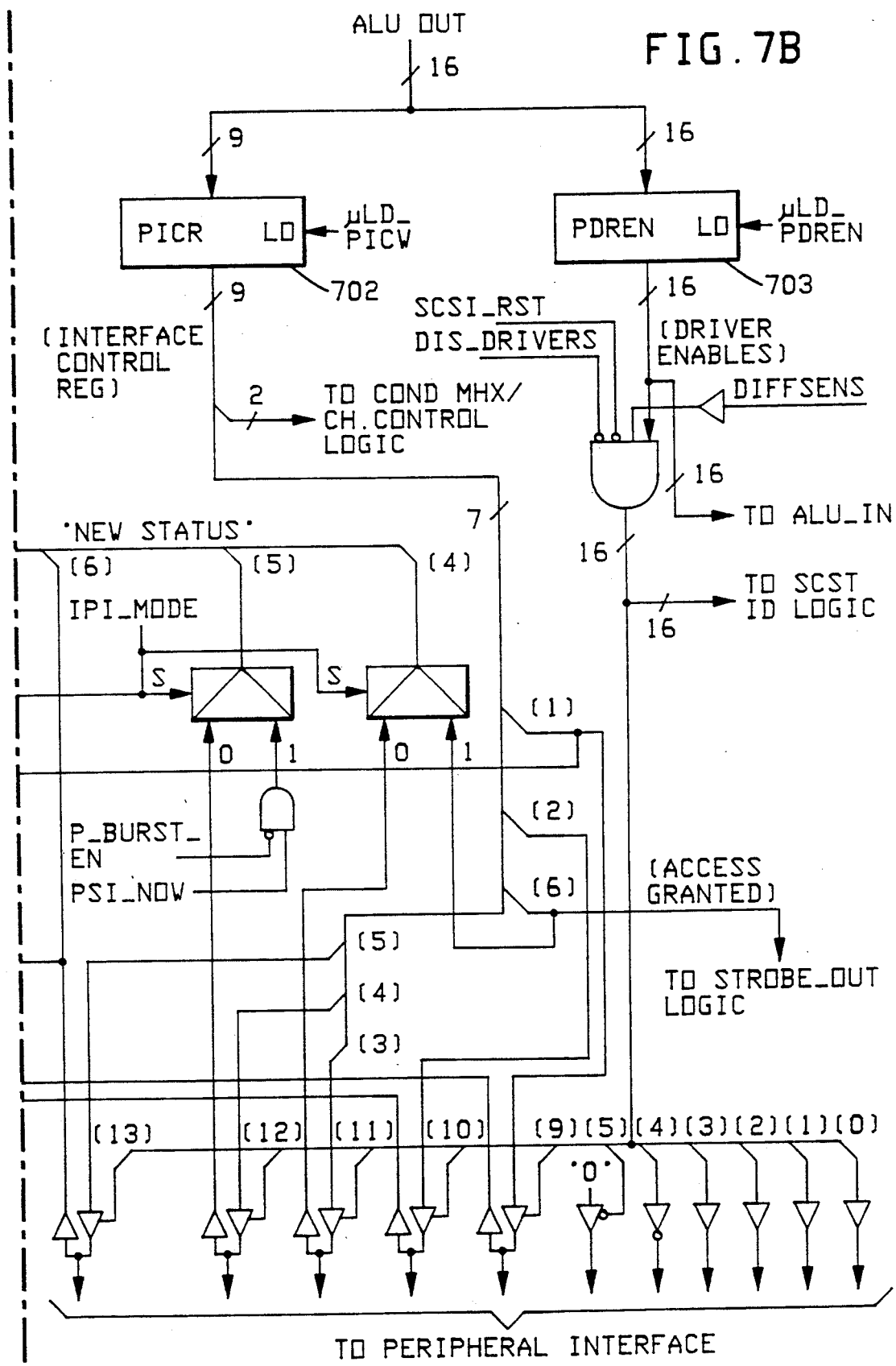

The PSTAT register 403 is loaded with control signal values which the channel expects to receive. The output of this register can be viewed by the SCCM 301 either directly or through the ALU 303. This mechanism provides the SCCM 301 with the ability to interpret the interface control signals. Operation of this register will be discussed below with reference to FIG. 7.

The peripheral channel control register (PCCR) 417 may be loaded by the SCCM 301 through the ALU 303. This register selects the proper mode of operation of the IACT chip. Mode selection includes selecting the mode of data transfer (i.e., whether data transfer is interlocked or synchronous), whether one byte or two bytes of data are transferred at a time, and byte significance (i.e., whether data should be processed in the order it is received, or if the byte positions of each successive two bytes of data should be swapped).

Figure 5:
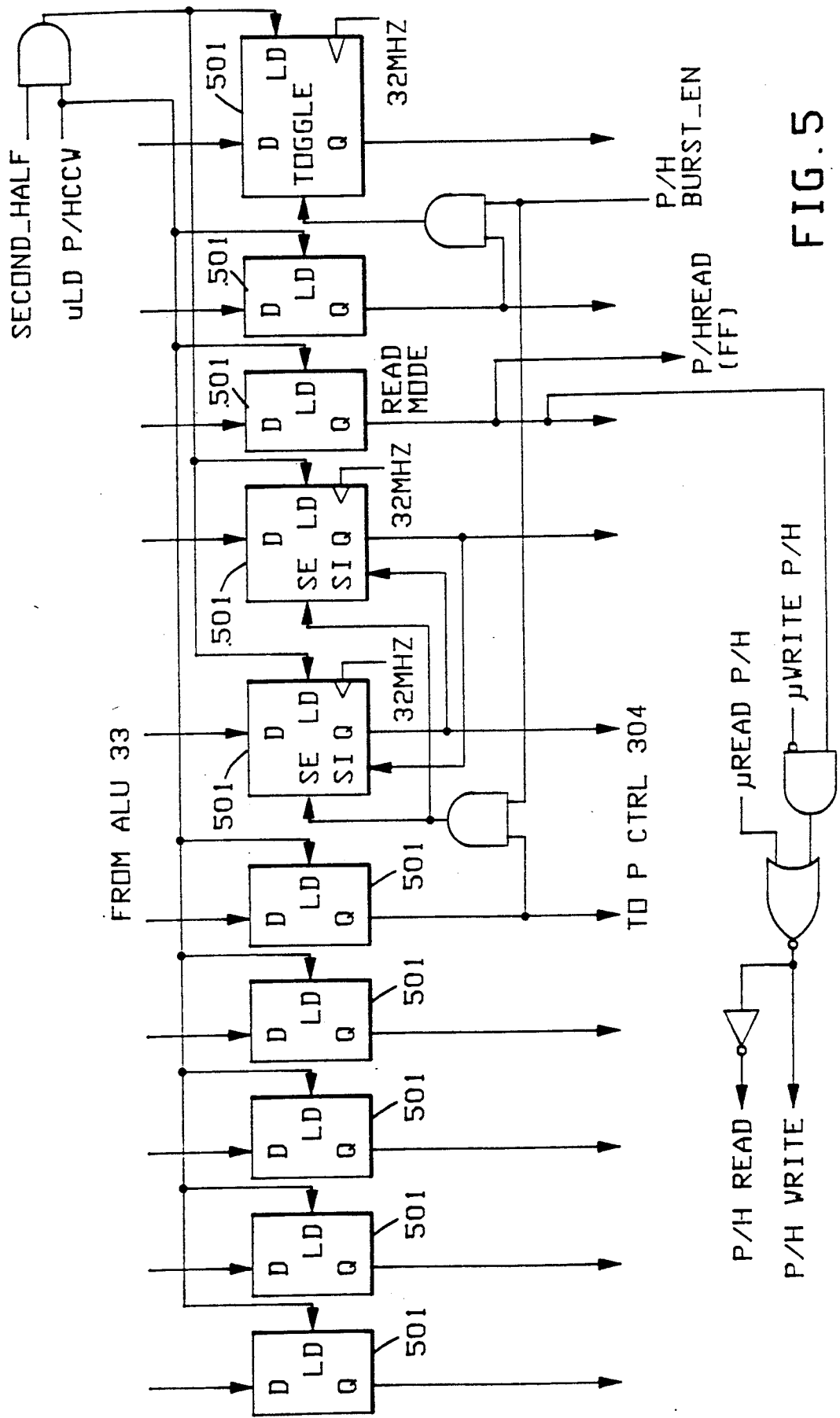
FIG. 5 is a logic diagram which shows the architecture of the channel control register shown in FIG. 4.

FIG. 5 shows an exemplary embodiment of the PCCR 417. In this embodiment, the PCCR includes a plurality of D-type flip flops 501. The inputs of these flip flops are coupled to respective inputs of ALU 303. The outputs are coupled to various control elements of the P CTRL 304. They can also be read by the ALU 303. The flip flops are loaded under control of the SCCM 301.

Referring to FIG. 4, The P-LATCH register 407 is used for storing data which is received by the I/O interface controller. If the data entering the interface controller consist of one byte, it is accumulated to form two bytes in one word. This accumulation occurs in the PSR register 410. In addition, as data is transferred between the P-LATCH register 407 and the PSR register 410, the byte position of the high level byte and the low level byte may be swapped. After the two byte word is formed in the PSR register 410, it is transferred to the P DATA register (PDR) 415. From the PDR 415, data is moved to the buffer memory 420. Similarly, if the data is being transmitted from the I/O interface controller to the I/O device, the data is transferred from the buffer memory 420 to the PDR 415. From the PDR 415, the data is moved to the PSR 410 register. If unpacking or byte swapping is desired, it is done between the PSR 410 and the P-LATCH 407 register. Finally, the data is loaded into the P-LATCH 407 register for transmission to the I/O device. The transfer of data between the peripheral and host sides is discussed below with reference to FIG. 10.

A synchronizer 405 is used for synchronizing an incoming strobe with the internal clock signal of the interface controller. When data appears on the controller interface, it is accompanied by a strobe signal, which indicates that the data appearing on the peripheral interface is valid. The synchronizer is designed to acknowledge the strobes at the fastest possible rate and with a minimum possible delay. This is accomplished by holding the internal combinatorial delays to a minimum and acknowledging the strobes without first synchronizing them to the clock. Details of the implementation of the synchronizer circuit are discussed below with reference to FIG. 14.

Data is clocked into the P LATCH register by using as a clock input, a signal which is derived from the strobe signal. Data is clocked into the PSR register at all times except when a plurality of signals which are derived from the output of the synchronizer disables the loading. Data is clocked into the PDR register by using as a clock input a signal which is derived, as described below, from the synchronizer output.

Figure 6B:
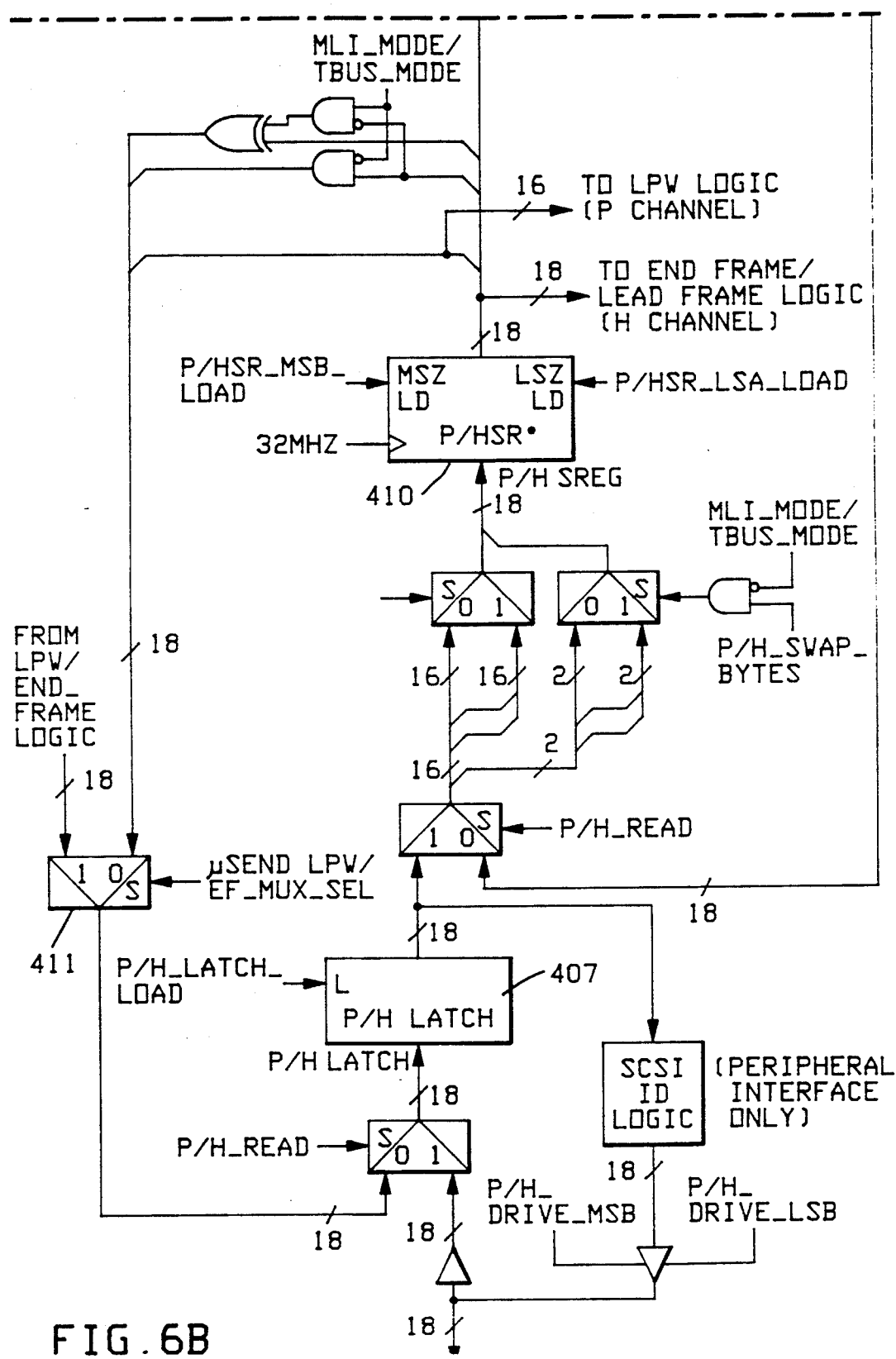

The present invention may use these clock signals in a preferred mode of operation (referred to as BURST mode). By operating in this mode, data may be quickly transferred between the host processor interface or the peripheral device interface of the I/O interface controller and the local memory of the I/O interface controller. Operation of the BURST mode is shown with reference to FIG. 6. Data is clocked into the P-LATCH register 407 responsive to the signal labeled P-LATCH LOAD. The signal P-LATCH LOAD is derived directly from the strobe. The signal marked PSR-MSB-LOAD is used as a clock for clocking data into the most significant byte positions of the PSR register. The signal PSR-MSB-LOAD is derived directly from the output of the synchronizer. Data is clocked into the least significant byte of the PSR register 410 through the signal labeled PSR-LSB-LOAD. The signal PSR-LSB-LOAD is derived directly from the synchronizer. The signal labelled PDR-LOAD loads the PDR register 415. It is derived from the output of the synchronizer and the state of local memory access logic 419.

The design of the I/O interface controller allows data to be collected into the P-LATCH register 407, the PSR register 410 and the PDR register 415 using signals derived from the strobe and synchronizer, respectively, until the sequencer detects a change in a plurality of control signals which appear on the interface. When the sequencer determines that the control signals have changed, the loading of data into the P-LATCH register 407, the PSR register 410 and the PDR register 415 may be suspended until the sequencer determines the reason for the change in control signals. The mechanism by which this is accomplished is described below with reference to FIG. 7.

At the beginning of a burst, the sequencer loads the control signals from the interface into the PSTAT register 705. This becomes the OLD STATUS 706. Control signals from the peripheral interface are then continually monitored as NEW STATUS. The OLD STATUS 706 value in the PSTAT register 705 is compared with the NEW STATUS value from the interface. If the comparator 704 determines that this value has changed, the signal P-STATUS-CHANGE is asserted. When P-STATUS-CHANGE is asserted, the signal P-BURST-ON is not asserted. This prevents the P-LATCH, the PSR and the PDR load controls from receiving output signals from the synchronizer. Thus, the loading of data into these registers is suspended. The sequencer can then evaluate the new STATUS value which has been stored in P-STAT 701 (under its control) and then determine whether the transmission of signals from the synchronizer to the register control function can resume.

The signal P-LATCH LOAD is derived directly from the incoming strobe signal. However, if the sequencer determines that the contents of the PSTAT register have been changed, the sequencer can prevent the strobe signal from reaching the P-LATCH register. In the same fashion, the loading of data into the PSR and the PDR registers may be suspended. Similarly, when the sequencer determines that the BURST mode may be continued, the sequencer can allow the strobe signal to again reach the P-LATCH, the PSR and the PDR registers.

Operation of the I/O interface controller in a typical data transfer operation is shown with reference to the flow chart diagram of FIG. 8.

At Step 801, the proper mode is selected. Selecting the proper mode is accomplished by loading a particular combination of bit values into the CCR register. This combination of bit values prepares the I/O interface controller to receive data in a variety of different formats. For example, data may be transferred to the I/O interface controller through either throttle mode, interlock mode or mirror mode. The decision as to which mode is proper depends upon the strobing requirements of the particular protocol being used. It may also be necessary to inform the controller whether data is being transferred to the controller one byte or two bytes at a time. If data is being transferred to the controller two bytes at a time, it may be necessary to designate whether the most significant byte is received first or second. Thus, by loading a single combination of bit values into the CCR register, a variety of information is conveyed to the controller.

At Step 802, data enters the P-LATCH register 407 from the interface between the I/O interface controller and the peripheral device. This data is then transferred to the PSR register 410 (Step 803). As data is transferred to the PSR register 410, the position of the most significant byte and the least significant byte may be exchanged through the byte map 409 (Step 804). When two bytes have accumulated in the PSR register 410 with proper byte significance, the data is moved to the PDR register 415 (Step 805). When buffer space is available in the local memory 420, access to the local memory is granted (Step 806). The data is then moved from the PDR register 415 to the local memory 420 (Step 807).

Figure 9:
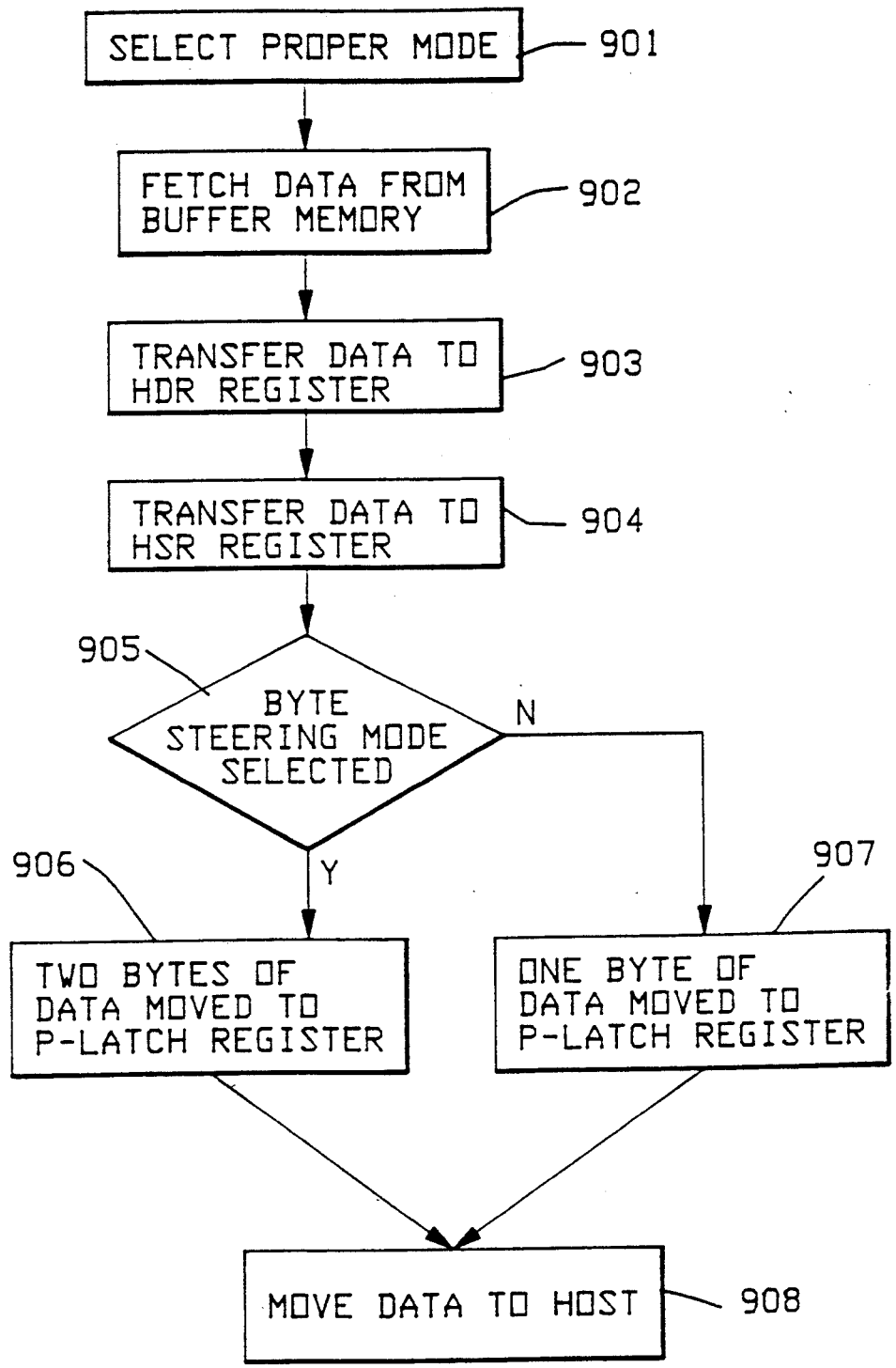
FIG. 9 is a flow chart diagram which shows data transfer from the local memory of the I/O interface controller shown in FIG. 4 to the I/O interface shown in FIG. 4.

Data is transferred from the local memory 420 to the I/O interface controller 103 through a process which is basically the opposite of that used to initially store data in the I/O interface controller. This is shown with reference to FIG. 9. At Step 901, the proper mode is selected. As stated before, this relates to whether the interface is operating in throttle, mirror or interlock mode, whether one byte or two bytes are transmitted at a time, the byte significance, etc. At Step 902, the data is fetched from the buffer memory 420. At Step 903, the data is transferred to the HDR register 465. At Step 904, the data is transferred to the HSR register 460. Data is moved from the HSR register 460 to the H-LATCH register 457 depending upon the strobing mode selected (Step 903). If byte steering mode has been selected, then two bytes of data are moved to the H-LATCH register 457 (Step 906). If strobing mode has been selected, then only one byte of data is moved to the H-LATCH register 457 (Step 907). At Step 908, the data is moved out of the H-LATCH register 457 and to the host via the host interface. The strobing mode selected determines when the data is valid on the host interface.

Data is passed between the H side and the P side through a queue structure which is implemented in the local memory under the direction of the sequencer 401. To allow data to be transferred between these two sides, a data structure referred to as an in-progress-operation table (IPOT) is used. An IPOT is a reference to a particular I/O operation. Every time a new task is issued to the channel, the channel allocates an IPOT. In a preferred embodiment of the present invention, the channel has a pool of 128 of these IPOTs. Each IPOT corresponds to one I/O operation that is in one of several states (i.e. currently being acted upon, waiting for some occurrence, etc.). In addition, a plurality of queues are implemented in the local memory. These queues include a host queue (H-QUEUE) and a command initiate queue (CI-QUEUE). When a command is received from the host, it is received into an IPOT which was linked into the H-QUEUE. If the command needs to be processed through the peripheral side, then it is transferred from the H-QUEUE to the CI-QUEUE. Every time the sequencer completes a data transfer operation, the sequencer returns to an idle state until another data transfer operation is to be performed.

Figure 11A:
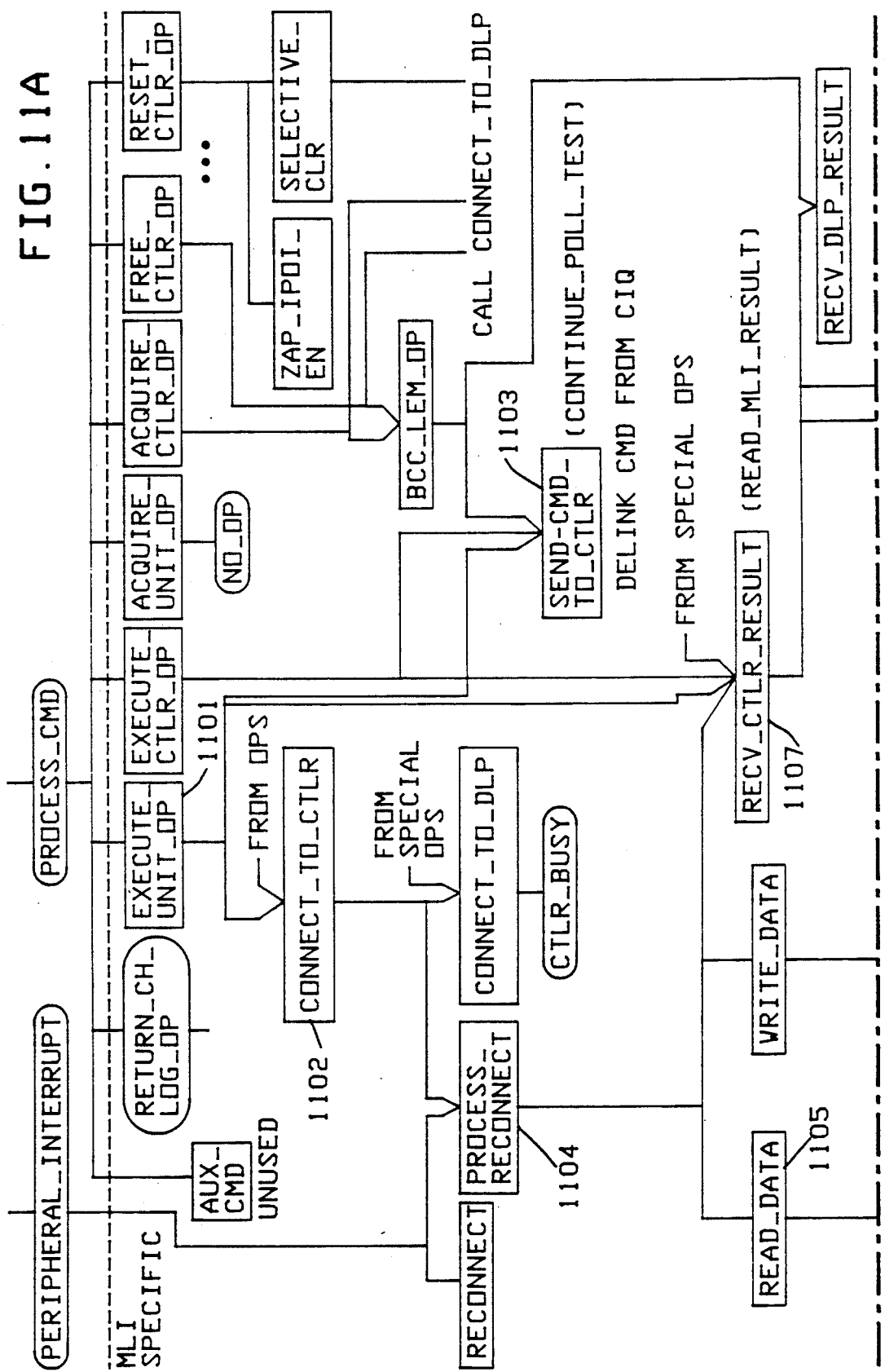
FIGS. 11A through B is a flow chart diagram which shows the sequence of operation of the MLI channel microcode which controls the sequencer shown in FIG. 3.
Figures 11, 11B:
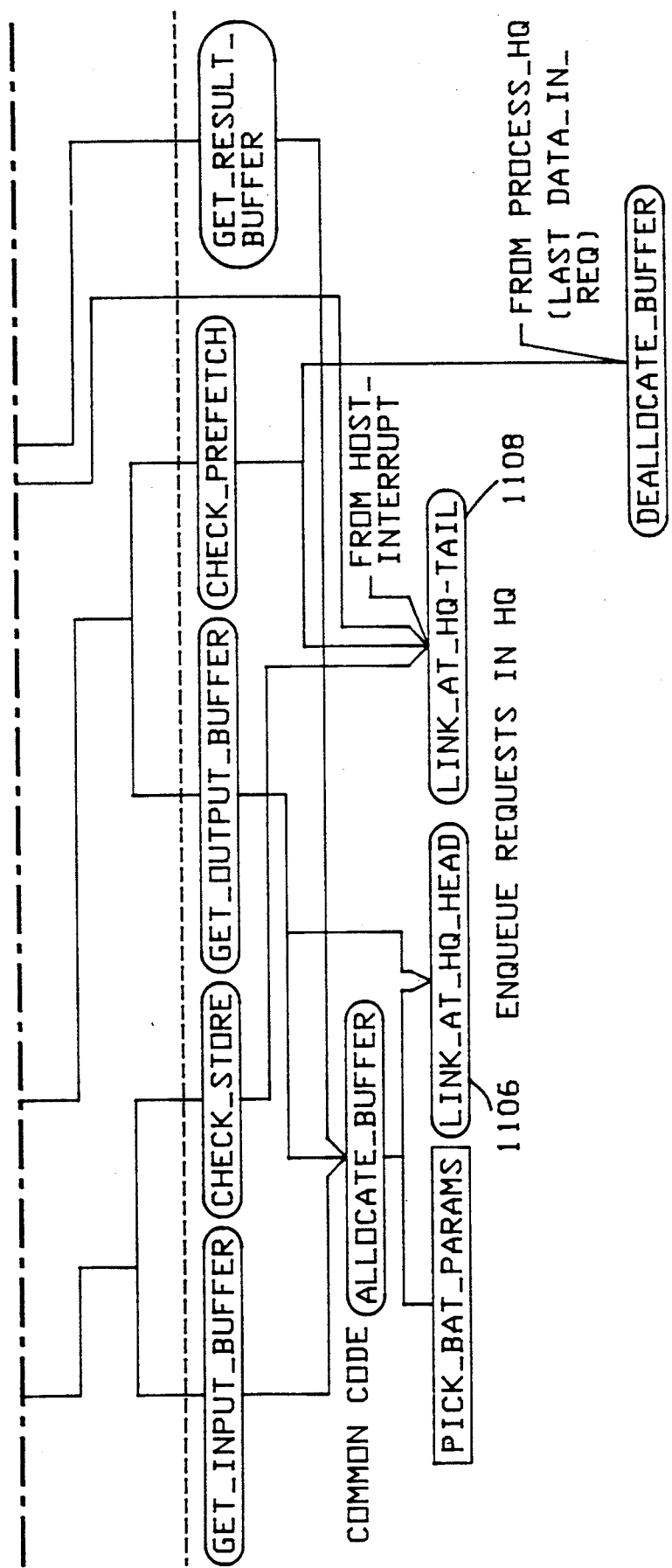
FIG. 11 which includes
Figure 12A:
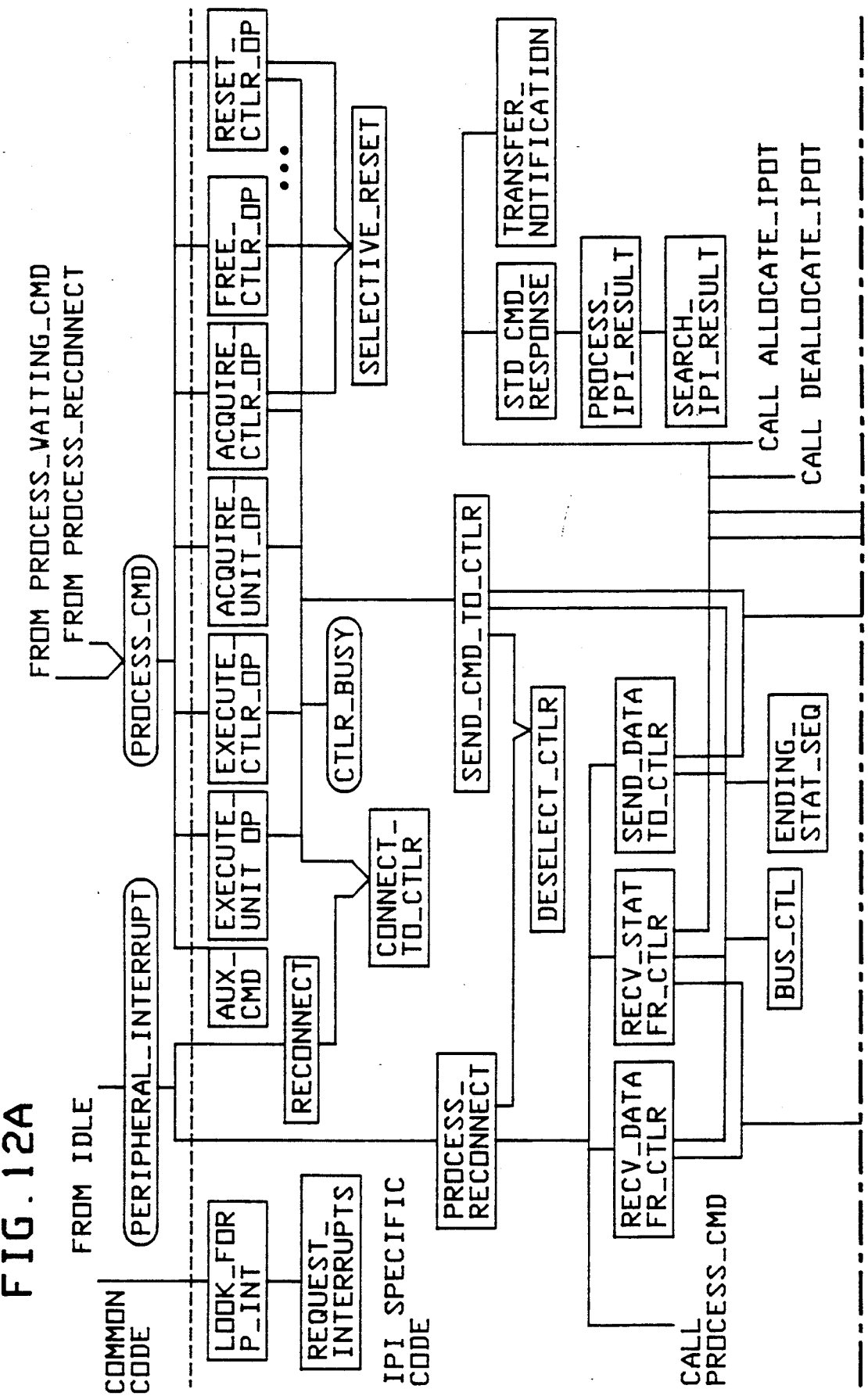
Figure 13:
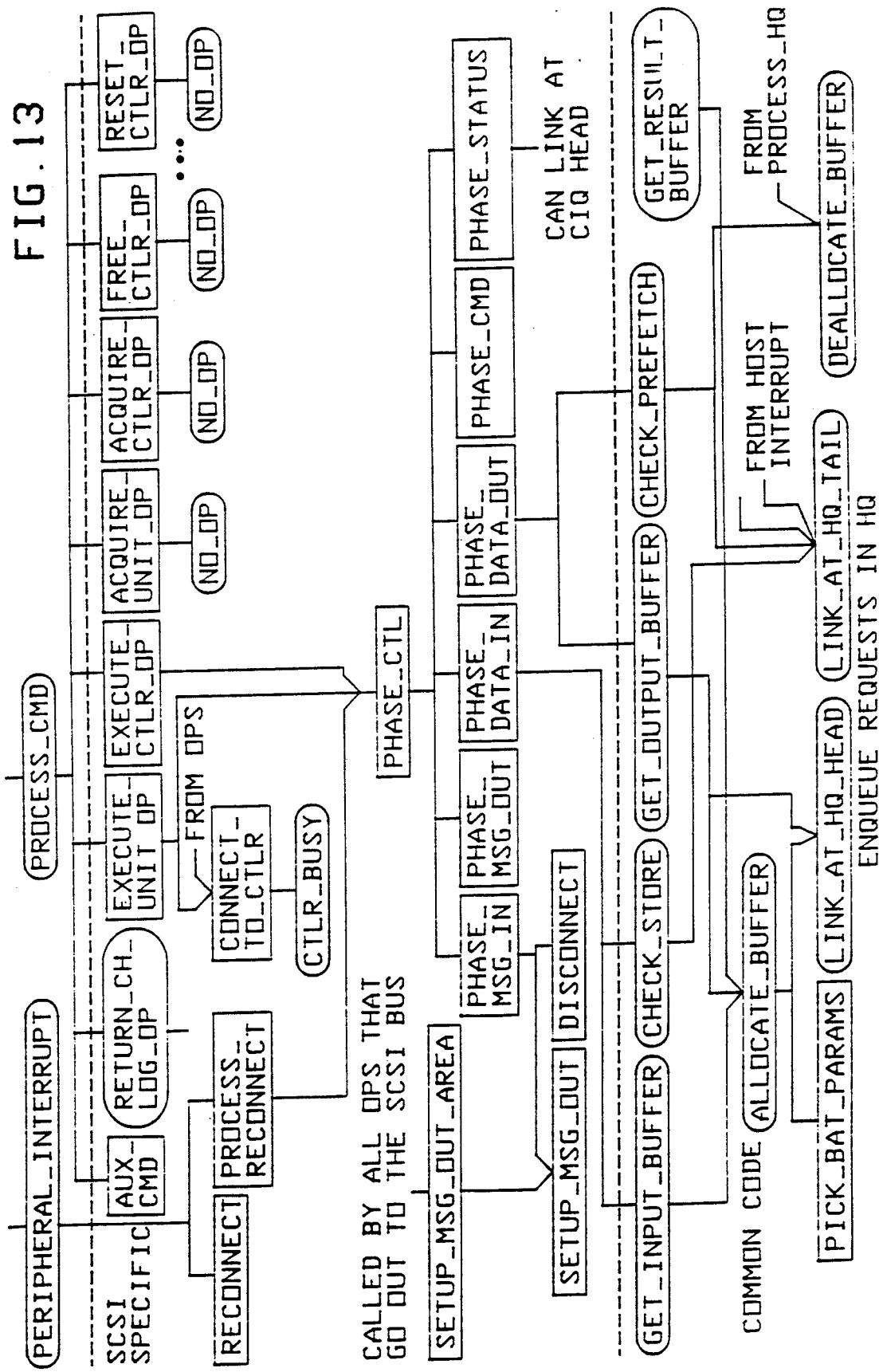
FIG. 13 is a flow chart diagram which shows the sequence of operations of the SCSI channel microcode which controls the sequencer shown in FIG. 3.

FIGS. 10 through 13 are connectivity diagrams which show the operation of the data transfer algorithm. The steps which are shown in FIG. 10 are steps which are performed regardless of the type of interface to which the I/O interface controller is coupled. After the steps shown in FIG. 10 are performed, the steps shown in either FIG. 11, FIG. 12 or FIG. 13 are performed, depending on whether the I/O interface controller is interfacing with a MLI channel, an IPI channel or a SCSI channel, respectively. Depending on the instruction which is decoded at the bottom of FIG. 10, execution of the data transfer algorithm continues from a specific point as shown at the top of FIGS. 11 through 13. In this manner, a control signal which is received under a first protocol may be translated to a control signal under a second protocol, before being retransmitted. While connectivity diagrams for MLI, IPI and SCSI interfaces are disclosed, it is contemplated from the information provided, that one skilled in the art could readily implement microcode to interface the I/O interface controller with any desired protocol.

Operation of an exemplary data transfer between a host and peripheral device under an MLI protocol is discussed with reference to FIGS. 10 and 11. As this discussion is only exemplary, only significant components of these figures are discussed.

At Step 1001, when power is first applied, the I/O interface controller enters a routine which is called H-STARTUP-PROTOCOL. In this routine, the channel manager unit (CMU) of the main processor and the I/O interface controller exchange information relating to the I/O interface controller over which communications will occur, and the protocol being used for communication between the I/O interface controller and the I/O device (e.g. MLI, IPI or SCSI). After the H-STARTUP-PROTOCOL has been performed, and the channel manager unit determines what type of bus exists, the I/O unit of the computer processor attempts to acquire the bus corresponding to the I/O interface controller. This is shown at Step 1002. This is followed by the steps of downloading microcode from the computer processor to the I/O interface controller (Step 1003) and storing this code in the control store RAM, performing the I/O interface controller self-test (Step 1004), and acknowledging to the computer processor that this operation was successful (Step 1005). The IACT then enters an IDLE state under control of the control store RAM (Step 1006).

From the IDLE state (Step 1006), the sequencer can receive a host interrupt (Step 1007). Upon detecting a host interrupt (Step 1007), the sequencer allocates an IPOT entry (Step 1008) initializes this IPOT entry to receive an I/O request from the host and links this IPOT entry into the tail of the H-QUEUE Step 1009). The sequencer then returns to the IDLE state (Step 1006). When the sequencer is able to process the command on the host side, it begins to process the IPOT in the H-QUEUE (Step 1010). The sequencer then transfers frame packets between the I/O interface controller and the host (Step 1011 and Step 1012). In this manner, handshaking is performed and the sequencer is able to obtain the I/O device command. The sequencer then returns to the IDLE state (Step 1006). Next, the sequencer looks at command in the IPOT which was linked into the H-QUEUE, delinks this IPOT and its corresponding commands from the H-QUEUE and links this IPOT and its corresponding command into the CI-QUEUE (Step 1010). The sequencer then returns to the IDLE state. At Step 1013, a polling mechanism determines that the P side is waiting for something to occur. After determining that there is indeed something linked into the CI-QUEUE, the sequencer removes the IPOT from the CI-QUEUE, the command in the IPOT is decoded (Step 1014) and the decoded command is executed. As shown at the bottom of FIG. 10, only one of a plurality of commands can be executed, depending upon what is decoded at Step 1014. The plurality of commands available for execution can be varied depending upon the type of interface to which the command is directed. Thus, one type of interface specific command can be decoded to perform a plurality of commands for a specific interface.

As shown in FIG. 11, if the command is decoded as an execute unit operation (Step 1101), then the sequencer connects the peripheral device to the I/O interface controller (Step 1102) and the sequencer sends the command through the controller to the peripheral device (Step 1103). The sequencer then delinks this command from the CI-QUEUE and returns to the IDLE state.

The sequencer remains in the idle state until an interrupt (Step 1015) is received from the peripheral device. The I/O interface controller then reconnects to the peripheral device (Step 1104) and begins to read data (Step 1105). Reading data is performed, preferably in accordance with the BURST mode operation, described previously. As data continues to be received, various parameters are chosen to complete the data transfer and the data is loaded into one of the several buffers. When the buffer has become relatively full, the IPOT for this task is linked into the tail of the H-QUEUE (Step 1108). If the type of transfer has a high level of priority, the IPOT is linked into the head of the H-QUEUE (Step 1106). The sequencer then returns to the IDLE state.

When the sequencer determines that a command in the H-QUEUE requires processing, this command is processed (Step 1010), and the sequencer returns to the IDLE state (Step 1011 and Step 1012). The I/O device then reconnects to the I/O interface controller (Step 1104) and sends the I/O device result (indicating successful data transfer Step 1107. The IPOT associated with this result is then linked into the tail of the H-QUEUE (Step 1108) and the sequencer returns to the IDLE state.

The sequencer then determines that something has been linked into the H-QUEUE. It then goes through the process of servicing the H-QUEUE (Step 1010) where the result is sent to the host (Step 1011). The sequencer locates the IPOT entry that has been linked into the H-QUEUE and deallocates this IPOT entry (Step 1016). At this point, the I/O transfer is completed.

By operating in this manner, data may be read on one side of the interface in the BURST mode without requiring intervention from the sequencer. Thus, while this data transfer is occurring, the sequencer is able to supervise data transfer on the host side of the interface which is not currently reading data. In other instances, the host as well as the peripheral side could be transferring data in the burst mode.

As previously stated, data signals are clocked into the P-LATCH register by applying a derivative of the incoming strobe signal to the clock input of P-LATCH register. Furthermore, data signals are clocked into the PSR register and the PDR register by synchronizing the incoming strobe signal with the I/O interface controller's system clock, and by applying this synchronized signal to the clock input of the PSR and the PDR registers.

Figure 15A:
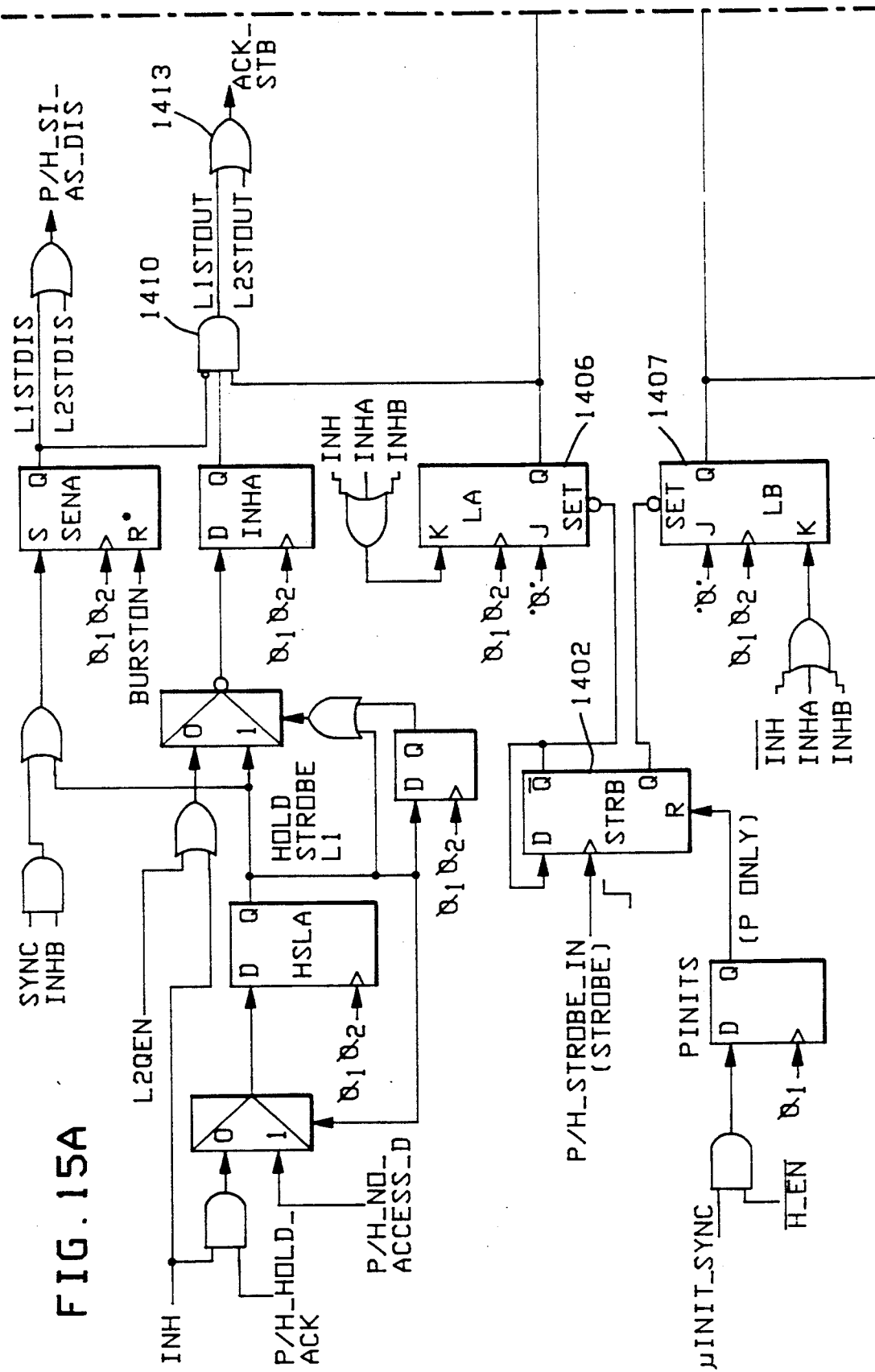
FIG. 15 which includes FIGS. 15 A through C is a logic schematic diagram which shows the internal structure of the strobe acknowledgement and synchronization circuits shown in FIG. 14.
Figure 15B:
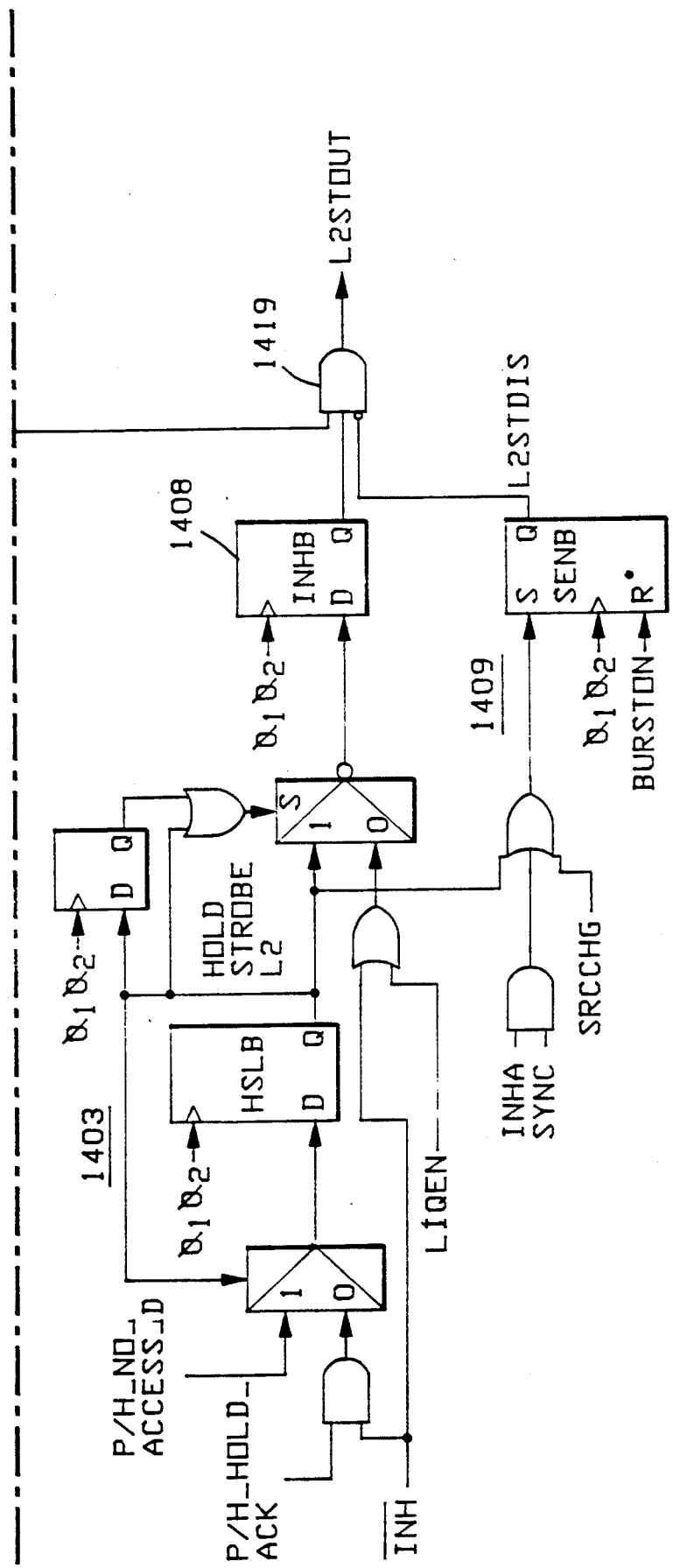
Figure 15C:
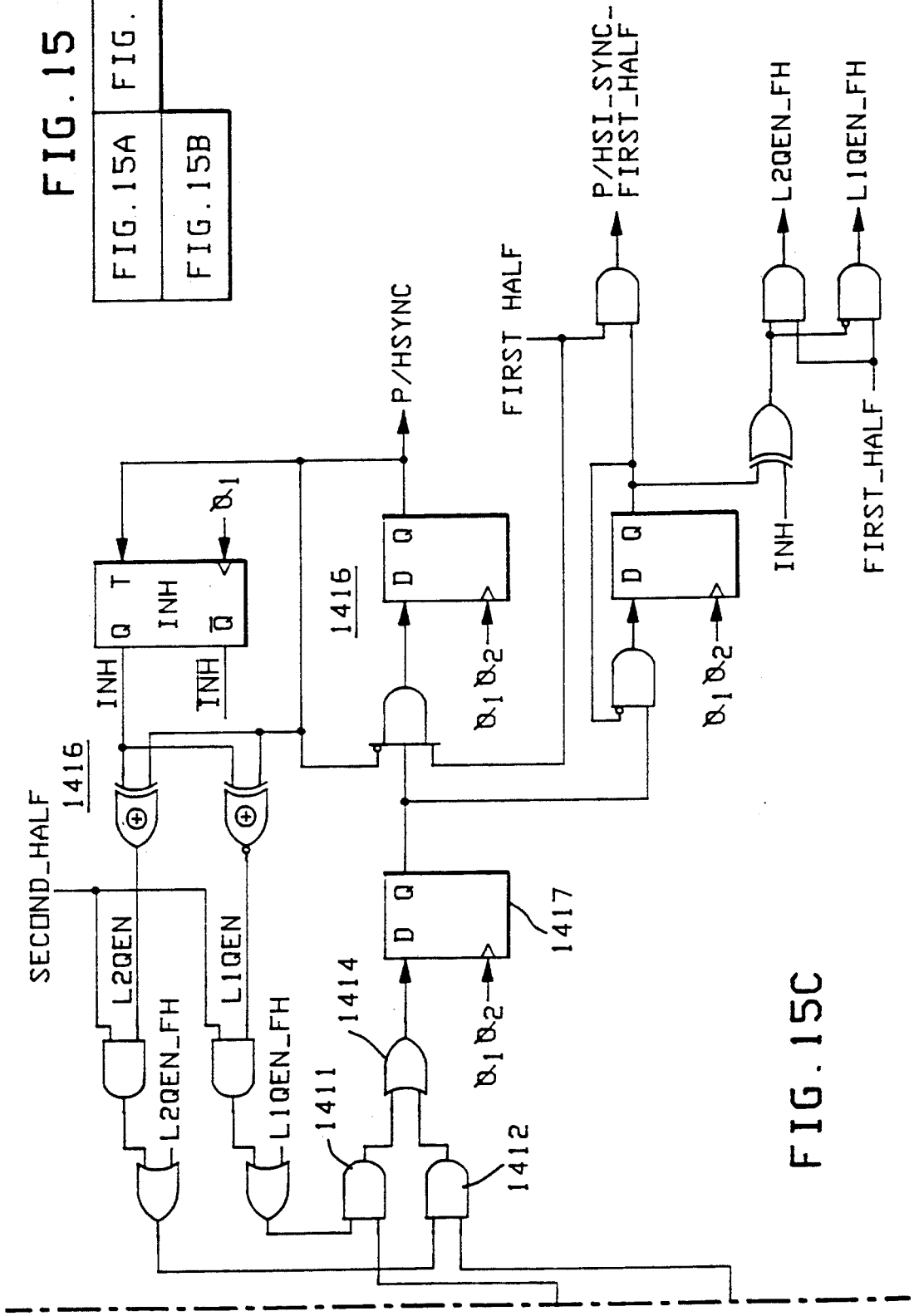

The mechanism which performs the acknowledgement of strobe signals is shown with reference to FIG. 14. An exemplary embodiment of this mechanism is shown with reference to FIG. 15. Strobe detection is accomplished through rising edge detection logic 1402, strobe latch LA 1406 and strobe latch LB 1407. The rising edge detection logic 1402 is designed to be initialized in a known state. In an exemplary embodiment of the invention, the rising edge detection logic is implemented with a toggle type flip-flop. When a first rising edge is detected, the Q output of the rising edge detection logic 1402 becomes high. When the following rising edge is detected, the Q/ output becomes high. Strobe latch LA 1406 and strobe latch LB 1407 can be implemented with JK type flip-flops. These latches are implemented so that they can be set asynchronously through the asynchronous SET input terminal. However, these latches can only be reset through the synchronous reset input terminal after a clock transition is detected.

When the first incoming strobe is detected by the rising edge detection logic 1402, the Q output is asserted high, thus causing strobe latch LA to be asynchronously set. When a succeeding incoming strobe is detected by the rising edge detection logic 1402, the Q/ output is asserted high, thus causing strobe latch LB to be asynchronously set.

When the Q output of strobe latch LA 1406 is asserted high, the output of status enable logic (SENA) 1404 is asserted low (discussed below) and the output of send strobe logic (INHA) 1405 is asserted high (discussed below), and a high signal appears on the acknowledge strobe output terminal. Similarly, when the Q output of strobe latch LB 1407 is asserted high, (discussed below) and the output of status enable logic (SENB) 1409 is asserted low (discussed below), and the acknowledge strobe B output terminal of AND gate 1419 is asserted high. This causes the output terminal of OR gate 1413 to be asserted high, thus causing the acknowledge strobe output terminal to be asserted high.

In addition to acknowledging an incoming strobe, it is necessary to synchronize the incoming strobe with the system clock. This is accomplished through the strobe steering and synchronizing logic.

The strobe steering and synchronizing logic consists of sync stage one 1417 and sync stage two 1418. The function of sync stage one 1417 and sync stage two 1418 is to synchronize an incoming strobe to the system clock. In a preferred embodiment of the invention, each sync stage may consist of a D flip-flop having its clock input terminal connected to receive the system clock signal. Thus, when an incoming strobe propagates to the output terminal of OR gate 1414, this signal will not appear on the sync output terminal until it has first been clocked into sync stage one 1417 and sync stage two 1418.

The strobe steering logic 1416 is used to determine whether the Q output of strobe latch LA or the Q output of strobe latch LB will be directed to the synchronizer. In a preferred embodiment of the invention, the strobe steering logic 1416 may consist of a toggle type flip-flop. The outputs of this flip-flop are labeled INH and INH/.

The INH and INH/ outputs have several functions. The INH output of strobe steering logic 1416, when it is asserted low, directs the Q output of strobe latch LA 1406 into the synchronizer. Similarly, the INH/ output of the strobe steering logic 1416, when it is asserted low, directs the Q output of strobe latch LB 1407 into the synchronizer. The output of the strobe steering logic 1416 will change every time a rising edge is detected on the T input terminal of the strobe steering logic 1416. Thus, when the synchronizer generates a SYNC signal, as a result of synchronizing to an incoming strobe, the output signal of the strobe steering logic 1416 changes.

By example, assume that the strobe steering logic had previously selected the Q output of strobe latch LA 1406. The toggling of the strobe steering logic 1416 causes the output of strobe latch LA 1406 to be deselected and the output of strobe latch LB 1407 to be selected. When a subsequent SYNC signal is generated by an incoming strobe, the Q output of strobe latch LB 1407 is deselected and the Q output of the strobe latch LA 1406 is again selected.

Strobe steering logic 1416 may also reset either strobe latch LA 1406 or strobe latch LB 1407. The INH output terminal of strobe steering logic 1416 is coupled to the RESET input terminal of strobe latch LA 1406. Similarly, the INH/ output terminal of strobe steering logic 1416 is coupled to the RESET input terminal of strobe latch LB 1407. Thus, if the Q output of strobe latch LA 1406 is asserted high, and this high signal propagates to the SYNC terminal, then the INH and INH/ output of strobe steering logic 1416 toggles. This deselects the Q output of strobe latch LA and resets it. Similarly, when the Q output of strobe latch LB 1407 is asserted high, and this signal propagates to the SYNC output terminal, the INH and INH/ outputs of the strobe steering logic 1416 toggles. When, as a result, INH/ is asserted high, the Q output of strobe latch LB 1407 is deselected and the strobe latch LB 1407 is reset.

As shown in FIG. 14, the propagation of a signal from the incoming strobe input terminal of rising edge detection logic 1402 to the acknowledge strobe output terminal of pulse shaper 1415 is accomplished in an asynchronous fashion. In other words, signal propagation to the output terminal is not dependant on the system clock. Using conventional CMOS logic (for example), the propagation delay from incoming strobe to strobe acknowledgement is on the order of nanoseconds.

As shown in FIG. 14, two AND gates, 1410 and 1419 are used to determine whether the Q output signal of strobe latch LA 1406 and the Q output signal of strobe latch LB 1407, respectively, propagate to the acknowledge strobe output terminal. Propagation of the signals of the respective strobe latches is dependant on the logic levels of a plurality of control signals which are coupled to the input terminals of AND gates 1410 and 1419. Status enable logic (SENA) 1404 and status enable logic (SENB) 1409 are used to determine whether a strobe should be acknowledged (i.e., whether a transition should occur on the acknowledge strobe output terminal). SENA 1404 and SENB 1409 are used to make this determination based, in part, upon whether the interface is in burst mode. If the interface changes to a non-burst-mode state, the BURST-ON control signal will change to a low level. This causes a high level to be asserted on the output terminals of SENA 1404 and SENB 1409, which, in turn, causes a high level to be asserted on an inverted input terminal of AND gate 1410 and AND gate 1419. Thus, a high level on the Q output of strobe latch LA 1406 or strobe latch LB 1407 does not propagate to the acknowledge strobe output terminal, causing the asynchronous acknowledge mechanism to be disabled.

Strobe steering logic 1416 may also affect the output signals from SENA 1404 and SENB 1409. When the signal INH has a logic high value, and this signal is applied to the appropriate input terminal of SENA, SENA then transmits a high signal to AND gate 1410 resulting in the transmission of a logic low value on the signal line marked ACK-STROBE (a). Thus, the signal on the acknowledge strobe output terminal is derived solely from the ACK-STROBE (b) input of OR gate 1413. Similarly, when INH/ has a logic high value, and this signal is applied to the appropriate input terminal of SENB 1409, then SENB transmits a high signal to AND gate 1419, resulting in the transmission of a logic low value on the signal line marked ACK STROBE (b). Thus, the signal on the acknowledge strobe output terminal is derived solely from the ACK-STROBE (a) input of OR gate 1413.

The buffer memory throttling logic 1401, 1403 in conjunction with the send strobe logic (INHA) 1405 and the send strobe logic (INHB) 1408, works in a manner which is similar to that of the status enable logic (SENA) 1404 and the status enable logic (SENB) 1409. However, the buffer memory throttling logic is controlled by the channel's buffer memory.

The buffer memory control and access logic 1401 indicates, when the I/O channel controller is receiving data, whether there is sufficient memory space in the buffer to accommodate the incoming data. When the I/O channel controller is sending data, the buffer memory control and access logic can also indicate, whether there is enough data in the buffer. If there is, either not enough memory space to accommodate the incoming data, or, not enough data in the buffer when the I/O channel controller is sending data, the buffer memory control and access logic, through the buffer memory throttling logic 1401, 1403, causes the send strobe logic 1405, 1408 to assert an output signal of logic zero. This causes logic level zero to be asserted on AND gates 1410 and 1419, thus preventing a strobe from being acknowledged asynchronously.

The strobe remembering and steering logic guarantees that if an incoming strobe has been acknowledged and is being processed through a given path, (for example through strobe latch LA 1406), then the next incoming strobe will also be acknowledged (for example, through strobe latch LB 1407). As previously stated, the outputs INH and INH/ from the strobe steering logic 1416 are also coupled to the inputs of the buffer memory throttling logic 1401 and 1403, respectively, and the status enable logic 1404 and 1409, respectively. If conditions on the interface or within the channel change, (i.e., when the buffer memory is about to become full) then the strobe steering logic outputs ensure that the path which will not be receiving the next incoming strobe will not acknowledge any strobe. For example, if the next incoming strobe is to be acknowledged through strobe latch LB, and if conditions (i.e., a change in the contents of the PSTAT register 701) require that strobe acknowledgment cease, the strobe steering logic 1416 ensures that the output of strobe latch LA 1406 is disabled. Thus, when the interface fires a strobe, this strobe is acknowledged (through strobe latch LB). The next incoming strobe, through strobe latch LA, is blocked. The sequencer can then examine the current conditions (i.e., the new contents of the PSTAT register 701) or any of the other internal conditions of the I/O controller interface (e.g. buffer full) and perform appropriate action.

An additional aspect of the present invention relates to the ability of the I/O interface controller to recognize events and time out type conditions which exist on the dissimilar host and peripheral side interfaces. Because interface events typically occur within a significantly large period of time, instead of simply waiting for an event to occur, this time may be used to perform internal algorithmic functions or to interrogate the state of the other interface. Thus the I/O interface controller can use one sequencer to drive two different interfaces. This is accomplished through an asynchronous event recognizer mechanism.

As previously stated, the peripheral control module 304 and the host control module 308 each contain logic and flip flops which maintain the control signals being driven by the channel to the interface. The flip flops maintain these signals until they are explicitly changed by the sequencer. Similarly, all incoming control signals from the interface are detected and held in flip flops.

A global timer is provided within the I/O interface controller. This is a free-running timer which may be initialized at power-up time. The sequencer can select the time value so that it may receive an interrupt from this timer and subsequently be awakened.

The sequencer is provided with a plurality of control words in the local memory in order to implement the asynchronous event recognizer mechanism. These words are shown with reference to FIG. 16. These words include an interrupt state word (ISW), a time count word (TCW), and a task reference word (TRW) for the P side and a TRW for the H side.

The ISW, in a preferred embodiment of the disclosed invention, is a 16 bit word which is subdivided into two 8 bit fields. Bits 15 through 8 correspond to the host interface. Bits 7 through 0 correspond to the peripheral side interface. Each one of these control fields is further subdivided into two, four bit fields. Each bit of the four most significant bits for the H and P side correspond to a particular event which the channel can monitor in parallel. If all four of these bits on each side are set, then the I/O interface controller can monitor four events simultaneously which correspond to these bit positions. An example of the type of events which may be monitored include indications that a timer interrupt has occurred, the bus is free, and the bus is reset. The less significant four bit fields on the P and H side are encoded. Each four bit field specifies one event out of 15 predefined events that the I/O interface controller can monitor. Examples of the type of events the I/O interface controller may monitor include a change of status on the controller interface, detection of a strobe, etc. A zero value in any field specifies that events are not to be monitored. Thus, with each eight bit field, the channel can monitor up to five events at a time on an interface.

The time count word (TCW), in a preferred embodiment of the present invention, is a sixteen bit word which is subdivided into two eight bit fields. Bits 15 through 8 correspond to the maximum time field for the H interface. Bit 7 through 0 correspond to the maximum time field for the P interface. A value in the time field (the time count value) corresponds to the maximum number of time units the channel will wait for a corresponding event to occur before declaring an error. A zero in this field indicates that the event is not timed. Hardware is provided on the P side and the H side to indicate that a time unit has elapsed. Every time the sequencer determines that a time unit has elapsed on the P or the H side, the time count value in the TCW is decremented. If the event that the sequencer is waiting on does not occur by the time the time count value reaches zero, a time out error is declared.

The P and H task reference word (TRW) contain the reference to the P and H task respectively, which is waiting on a particular event. The channel is capable of performing several tasks simultaneously. When the P side or the H side asks the sequencer to wait for an event, that side's task reference (IPOT address) is saved in the corresponding task reference word. This is used later to identify the task once the event has been detected on that side.

Figure 17A:
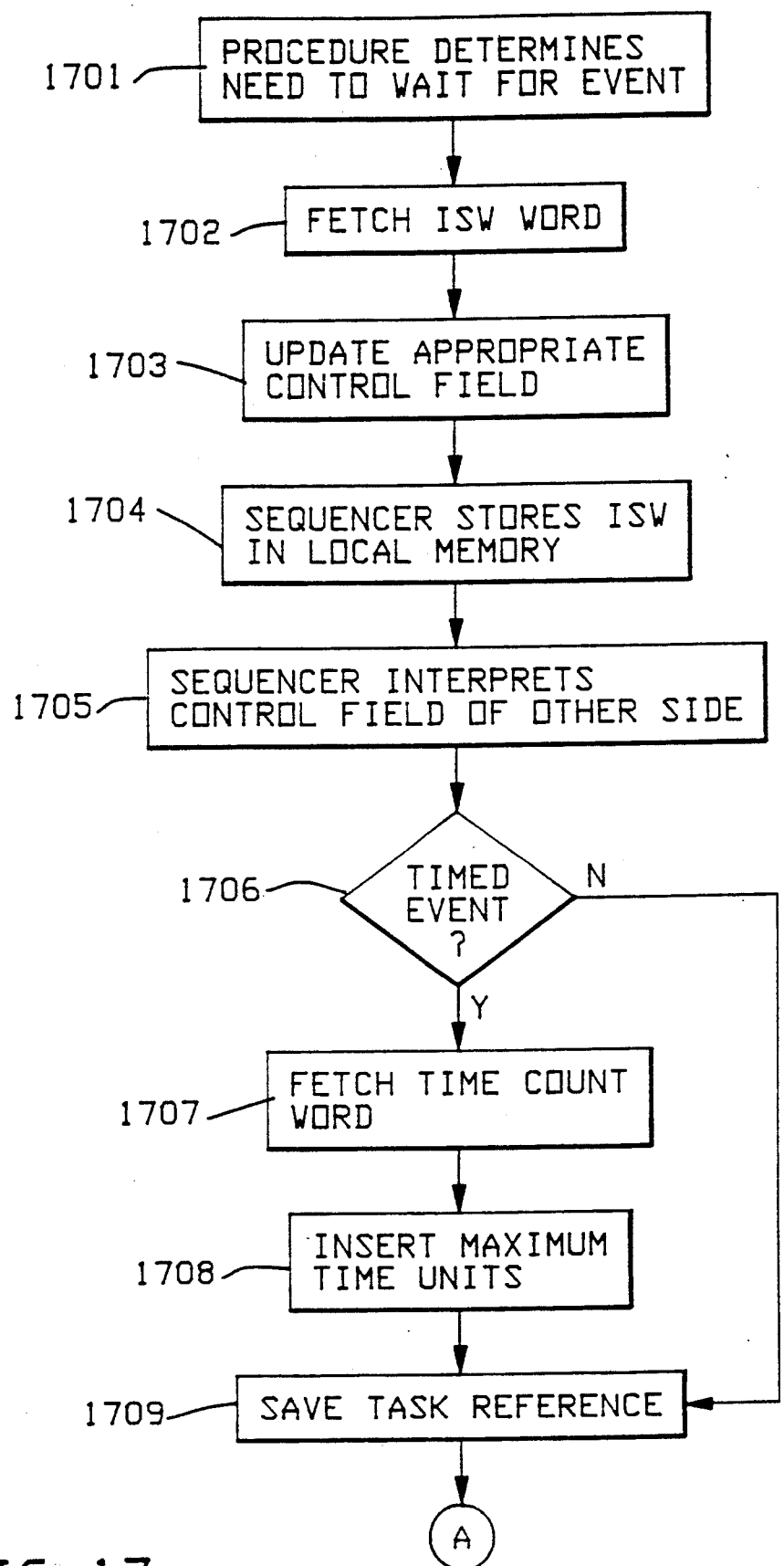
FIGS. 17a and b are flow chart diagrams which show the sequence of operation of the asynchronous event recognizer which use the data structure shown in FIG. 16.
Figure 17B:
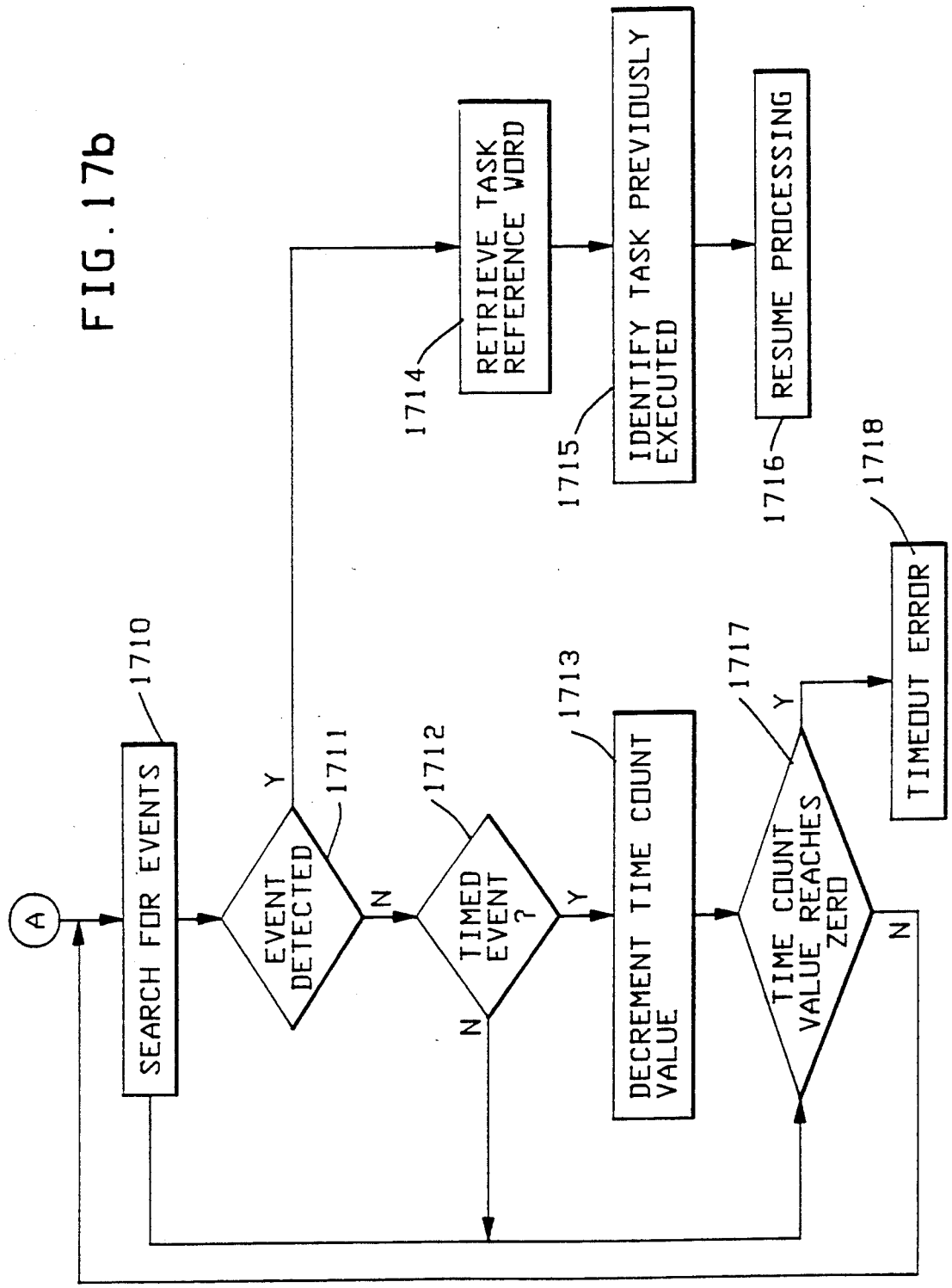

Operation of the asynchronous event recognizer mechanism is shown with reference to FIGS. 17a and 17b. At Step 1701, a process running on the P side or the H side determines a need to wait for an event. At Step 1702, the ISW word is fetched. At Step 1703, the appropriate control field in the ISW word is updated. At Step 1704, the sequencer stores this word in local memory. At Step 1705, the sequencer interprets the control field of the other side of the ISW. At Step 1706, the sequencer determines whether a timed event is occurring. If a timed event is not occurring, then processing transfers to Step 1709, where the task reference is saved. Otherwise, at Step 1707, the time count word is fetched and at Step 1708, the maximum number of time units (the time count value) is inserted into the time count word. Processing then transfers to Step 1709 where the task reference word is saved. Processing transfers from Step 1709 to Step 1710 through off-page connector A. At Step 1710, the sequencer searches for events. At Step 1711, if an event is detected, then at Step 1714, the task reference word is retrieved. At Step 1715, the task that was being worked on is identified. At Step 1716, processing is resumed. At Step 1711, if an event was not detected then processing continues to Step 1712. At Step 1712, if the event is not timed, then processing continues at Step 1710 where event searching resumes. Otherwise, if the event is timed, then at Step 1713, the time unit word is decremented. At Step 1717, if it is determined that the time count value has reached zero, then at step 1718, a time-out error is declared. Otherwise, processing transfers from Step 1717 to Step 1710, at which point the searching for events resume.

Although the invention has been described in terms of an I/O interface controller for data transfers between a computer processor and an I/O device, it is contemplated that it may also be used to establish a communications path between two, otherwise independent computer processors utilizing respectively different protocols.

While the invention has been described in terms of an exemplary embodiment, it is contemplated that it may be practiced as outlined above with modification within the spirit and scope of the appended claims.

What is claimed:

1. Apparatus for transferring a plurality of data values between a first data processing device and a second data processing device, wherein said first data processing device transmits a first plurality of control signals corresponding to a first protocol and said second data processing device receives a second plurality of control signals corresponding to a second protocol, comprising:

first control means, coupled to said first data processing device, for receiving said first plurality of control signals from said first data processing device through any one of a first plurality of physical interfaces wherein one of said first plurality of physical interfaces is different from another one of said first plurality of physical interfaces;

translation means, coupled to said first control means, for translating said plurality of first control signals to said plurality of second control signals;

second control means, coupled to said translation means, for transmitting said second plurality of control signals to said second data processing device through any one of a second plurality of physical interfaces wherein one of said second plurality of physical interfaces is different from another one of said second plurality of physical interfaces;

first data means, coupled to said first data processing device, for receiving said plurality of data values from said first data processing device; and second data means, coupled to said first data means, for transmitting said plurality of data values to said second data processing device.

2. The apparatus of claim 1, wherein said first plurality of control signals comprises a control signal and a further control signal, and said first control means comprises:

means for receiving said control signal;
   means for receiving said further control signal;
   comparison means for comparing said control signal to said further control signal; and
   means, responsive to said comparison means, for selectively inhibiting said first data means from receiving said plurality of data values from said first data processing device.

3. Apparatus for transferring a plurality of data values between a first data processing device and a second data processing device, each of said data values comprising a first data value and a second data value wherein said first data processing device transmits a first plurality of control signals corresponding to a first protocol and said second data processing device receives a second plurality of control signals corresponding to a second protocol, comprising:

first control means, coupled to said first data processing device, for receiving said first plurality of control signals from said first data processing device;

translation means, coupled to said first control means, for translating said plurality of first control signals to said plurality of second control signals;

second control means, coupled to said translation means, for transmitting said second plurality of control signals to said second data processing device;

first data means, coupled to said first data processing device, for receiving said plurality of data values from said first data processing device; and second data means, coupled to said first data means, for transmitting said plurality of data values to said second data processing device;

said first data means further comprising:

latch means for sequentially receiving said first data value, transmitting said first data value, receiving said second data value and transmitting said second data value;

synchronization register means, coupled to said latch means, for sequentially receiving said first data value and said second data value to form a packed data value, and data register means, coupled to said synchronization register means, for receiving said packed data value from said synchronization register means.

4. The apparatus of claim 3, wherein said packed data value comprises a most significant portion corresponding to said first data value and a least significant portion corresponding to said second data value.

5. The apparatus of claim 3, wherein said packed data value comprises a most significant portion corresponding to said second data value and a least significant portion corresponding to said first data value.

6. The apparatus of claim 1, wherein said translation means includes:

memory means having a plurality of memory locations containing respective ones of said plurality of second control signals, and further comprising:

receiving means for receiving at least one of said first plurality of control signals;

mapping means coupled to said receiving means and said memory means, for mapping said one control signal to at least one of said plurality of memory locations and for transmitting at least one of said plurality of second control signals to said second control means.

7. Apparatus for transferring a plurality of data values between a first data processing device and a second data processing device, wherein said first data processing device transmits a first plurality of control signals corresponding to a first protocol and said second data processing device receives a second plurality of control signals corresponding to a second protocol, comprising:

first control means, coupled to said first data processing device, for receiving said first plurality of control signals from said first data processing device;

translation means, coupled to said first control means, for translating said plurality of first control signals to said plurality of second control signals;

second control means, coupled to said translation means, for transmitting said second plurality of control signals to said second data processing device;

first data means, coupled to said first data processing device, for receiving said plurality of data values from said first data processing device; and second data means, coupled to said first data means, for transmitting said plurality of data values to said second data processing device;

said apparatus further including circuitry for receiving a data ready strobe from a data device, for returning an acknowledgement strobe to said data device, and for generating a synchronization signal, said synchronization signal synchronized with a system clock signal, said circuitry comprising:

edge detection means, responsive to a transition of said data ready strobe, for storing an edge detection logic value in said edge detection means;

strobe acknowledgement means, coupled to said edge detection means and responsive to said edge detection logic value, for asynchronously transmitting said acknowledgement strobe to said data device;

clock synchronization means, coupled to said edge detection means and responsive to said edge detection logic value and to a transition of said system clock signal, for generating said synchronization signal.

8. The apparatus of claim 7, wherein said data device provides data with said data ready strobe and said data is stored in the first data means responsive to said data ready strobe.

9. The apparatus of claim 1, wherein said first data processing device and said second data processing device are each computer processors.

10. The apparatus of claim 1, wherein said first data processing device is an input/output (I/O) device and said second data processing device is an I/O channel.

11. The apparatus of claim 1, wherein said first data processing device is an input/output (I/O) channel and said second data processing device is an I/O device.

12. A system for receiving a data signal accompanied by a data ready strobe from a computer device, for returning an acknowledgment strobe to said computer device, and for generating a synchronization signal to synchronize said data signal to a system clock signal, said system comprising:

edge detection means, responsive to a transition of said data ready strobe, for storing an edge detection logic value in said edge detection means;

strobe acknowledgement means, coupled to said edge detection means and responsive to the logic value stored by said edge detection logic value, for generating said acknowledgement strobe and for asynchronously transmitting said acknowledgement strobe to said computer device;

clock synchronization means, coupled to said strobe latch means and responsive to said edge detection logic value and to a transition of said system clock signal, for generating said synchronization signal.

13. A system for receiving a data element accompanied by a data ready strobe and a further data element accompanied by a further data ready strobe from a computer device, for returning an acknowledgement strobe and a further acknowledgement strobe, respectively, to said computer device, and for generating a synchronization signal, and a further synchronization signal, said system comprising:

edge detection means, responsive to a transition of said data ready strobe, for storing an edge detection logic value, and responsive to said further data ready strobe, for storing a further edge detection logic value;

first strobe acknowledgement means, coupled to said edge detection means and responsive to said edge detection logic value, for asynchronously transmitting said acknowledgement strobe to said data device;

first clock synchronization means, coupled to said strobe latch means and responsive to said edge detection logic value and to a transition of said system clock signal, for generating said synchronization signal;

second strobe acknowledgement means, coupled to said edge detection means and responsive to said further edge detection logic value, for asynchronously transmitting said further acknowledgement strobe to said data device;

second clock synchronization means, coupled to said further strobe latch means and responsive to said further edge detection logic value and to a transition of said system clock signal, for generating said further synchronization signal.

14. Apparatus for recognizing one of a first event and a second event wherein said first event and said second event are each signified by a respective signal, and for executing a task associated with one of said first event and said second event, respectively, comprising:

first storage means for storing a first reference value corresponding to said first event;

second storage means for storing a second reference value corresponding to said second event;

sequencer means, coupled to said first storage means and said second storage means, for receiving said first reference value and said second reference value, and for detecting said signal which signifies said first event or said signal which signifies said second event;

further storage means coupled to said first storage means and said second storage means for storing a first task reference value corresponding to said first event and a second task reference value corresponding to said second event; and means coupled to said further storage means and responsive to one of said first event and said second event for respectively executing one of said task corresponding to said first task reference value and said task corresponding to said second task reference value.

15. The apparatus of claim 14 wherein said first storage means and said second storage means are an interrupt state word.

16. The apparatus of claim 14 wherein said task reference value is stored in a task reference word.

17. The apparatus of claim 14, wherein said first storage means and said second storage means each further include means for storing a plurality of reference values corresponding to a plurality of events.

18. The apparatus of claim 17 wherein said sequencer means further includes means for receiving at least one of said plurality of reference values corresponding to said plurality of events.

19. An I/O interface controller for transferring communications between a host processor and an I/O device, comprising:

host side means for communicating with said host processor through any one of a first plurality of physical interfaces wherein one of a first plurality of physical interfaces is different from another one of said first plurality of physical interfaces and wherein said host processor communicates using a first communications protocol;

peripheral side means for communicating with said I/O device through any one of a second plurality of physical interfaces wherein one of said second plurality of physical interfaces is different from another one of said second plurality of physical interfaces and wherein said I/O device communicates using a second communications protocol;

means for independently programming said host side means to communicate with said host processor using said first communications protocol and for programming said peripheral side means to communicate with said I/O device using said second communications protocol, respectively; and means for translating communications between said first communications protocol and said second communications protocol and for transferring communications between said host side means and said peripheral side means.

20. An I/O interface controller for enabling communications, including transferring data and a plurality of control signals, between a host processor and an I/O device, comprising:

a plurality of registers, including at least one register for establishing control, including exchanging at least one of said plurality of control signals, with said I/O device;

at least one register for establishing control, including exchanging at least one of said plurality of control signals, with said host processor; and at least one register for transferring data between said I/O device and said host processor;

an arithmetic logic unit for processing said plurality of control signals and said data; and a condition code multiplexer for examining the contents of said plurality of registers and for transmitting to said arithmetic logic unit a plurality of conditioning signals indicating the contents of said plurality of registers, wherein said arithmetic logic unit performs predetermined operations responsive to said conditioning signals.

21. The I/O interface controller of claim 20, wherein said I/O interface controller is implemented in a single integrated circuit.

22. An I/O interface controller for receiving at least one of a plurality of host commands from a host processor and for transferring data between the host processor and an I/O device, comprising:

host interface means for transferring data between said host interface means and said host processor through any one of a first plurality of physical interfaces wherein one of said first plurality of physical interfaces is different from another one of said first plurality of physical interfaces responsive to said one host command;

peripheral interface means for transferring data between said peripheral interface means and said I/O device through any one of a second plurality of physical interfaces wherein one of said second plurality of physical interfaces is different from another one of said second plurality of physical interfaces responsive to at least one of a plurality of peripheral commands;

host queue means, coupled to the host interface means, for receiving said one host command from the host processor;

sequencer means coupled to said host queue means for evaluating said one host command, for mapping said one host command to at least one of said plurality of peripheral commands and for transmitting said one peripheral command to said peripheral interface means.

23. The I/O interface controller of claim 22 further comprising:

command initiate queue means, coupled to the peripheral interface means, for receiving said one host command from said host queue means;

wherein said sequencer means evaluates said one host command from said command initiate queue means.

24. A method of receiving a host command from a host processor and for transferring data between a host processor and an I/O device, comprising the steps of:
a) receiving said host command from the host processor through any one of a first plurality of physical interfaces wherein one of said first plurality of physical interfaces is different from another one of said first plurality of physical interfaces;
b) linking said received host command into a first queue;
c) translating said host command into at least one I/O device command;
d) transferring said one I/O device command to said I/O device through any one of a second plurality of physical interfaces wherein one of said second plurality of physical interfaces is different from another one of said second plurality of physical interfaces; and
e) transferring data between said I/O device and said host processor responsive to said I/O device command.

25. Apparatus for receiving a host command from a host processor and for transferring data between said host processor and an I/O device, comprising:
a) host interfacing means for receiving at least one of said plurality of host commands from said host processor through any one of a first plurality of physical interfaces wherein one of said first plurality of physical interfaces is different from another one of said first plurality of physical interfaces;
b) linking means for linking said received host command into a first queue;
c) translating means for translating said received host command into at least one I/O device command;
d) command transferring means for transferring said I/O device command to said I/O device through any one of a second plurality of physical interfaces wherein one of said second plurality of physical interfaces is different from another one of said second plurality of physical interfaces; and e) data transferring means coupled to said I/O device and to said host processor for transferring data between said I/O device and said host processor.

26. A method of transferring data between a host processor and an I/O device using an interface controller, comprising:
a) transmitting an interrupt from said host processor to said interface controller through any one of a first plurality of physical interfaces wherein one of said first plurality of physical interfaces is different from another one of said first plurality of physical interfaces;
b) transmitting a host command from said host processor to said interface controller;
c) linking said received host command into a first queue;
d) executing at least one I/O command corresponding to said received host command; and p1 e) transferring data via said interface controller from said I/O device to said host processor.

27. The method of claim 26 wherein step c) includes the additional step of transferring said received host command from said first queue to a second queue and wherein step d) includes the step of executing at least one I/O command corresponding to said received host command located in said second queue.

28. The method of claim 26 wherein step d) is preceded by the step of transmitting a communication establishment signal to said I/O device by said interface controller.

29. The apparatus of claim 1, wherein said translation means translates said plurality of first control signals to said plurality of second control signals by executing a respective one of a plurality of program routines based upon a respective one of said plurality of first control signals which is received.

30. An I/O interface controller in accordance with claim 19, wherein said means for translating communications translates said plurality of first control signals to said plurality of second control signals by executing a respective one of a plurality of program routines based upon a respective one of said plurality of first control signals which is received.

31. An I/O interface controller in accordance with claim 22, further including translation means which translates said plurality of host commands to said plurality of peripheral commands by executing a respective one of a plurality of program routines based upon a respective one of said plurality of host commands which is received.

32. A method of receiving a host command from a host processor in accordance with claim 24, wherein step c) includes the step of translating said host command into at least one I/O device commands by executing a respective one of a plurality of program routines based upon said host command which is received.

33. Apparatus for receiving a host command from a host processor in accordance with claim 25, wherein said translating means translates said host command to said I/O device command by executing a respective one of a plurality of program routines based upon said host command which is received.

* * * * *

UNITED STATES PATENT AND TRADEMARK OFFICE
CERTIFICATE OF CORRECTION

PATENT NO. : 5,289,580
DATED : February 22, 1994
INVENTOR(S) : Latif et al.

It is certified that error appears in the above-indentified patent and that said Letters Patent is hereby corrected as shown below:

Claim 19, Column 20, line 6, delete "a" and insert --said--;

Claim 26, Column 22, line 18, delete "pl" after "and";

Claim 26, Column 22, line 18, start new paragraph with "e)".

Signed and Sealed this

Twentieth Day of September, 1994

Attest:

BRUCE LEHMAN

*Attesting Officer*    *Commissioner of Patents and Trademarks*